(12) United States Patent
Goto et al.

(10) Patent No.: US 8,296,057 B2
(45) Date of Patent: Oct. 23, 2012

(54) MOBILE BODY POSITION INFORMATION TRANSMITTING DEVICE FOR NAVIGATION SYSTEM, AND MOBILE BODY POSITION INFORMATION TRANSMISSION METHOD AND PROGRAM FOR NAVIGATION SYSTEM

(75) Inventors: Souju Goto, Yokohama (JP); Hideyuki Nagatomo, Kawasaki (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 545 days.

(21) Appl. No.: 12/518,444

(22) PCT Filed: Dec. 14, 2007

(86) PCT No.: PCT/JP2007/074135
§ 371 (c)(1),
(2), (4) Date: Jun. 10, 2009

(87) PCT Pub. No.: WO2008/072734
PCT Pub. Date: Jun. 19, 2008

(65) Prior Publication Data
US 2010/0063729 A1    Mar. 11, 2010

(30) Foreign Application Priority Data

Dec. 15, 2006  (JP) ................................. 2006-339027
Apr. 27, 2007  (JP) ................................. 2007-118547

(51) Int. Cl.
*G01C 21/00*    (2006.01)

(52) U.S. Cl. ...................................................... 701/408

(58) Field of Classification Search .................. 701/400, 701/408, 412, 422, 425, 430, 472, 487, 517
See application file for complete search history.

(56) References Cited

U.S. PATENT DOCUMENTS

2003/0084119 A1 * 5/2003 Ichimura ....................... 709/217
2003/0164779 A1   9/2003 Gieseke et al.

FOREIGN PATENT DOCUMENTS

DE        100 10 436       9/2001
(Continued)

OTHER PUBLICATIONS

International Search Report for PCT/JP2007/074135.
(Continued)

*Primary Examiner* — Kim T Nguyen
(74) *Attorney, Agent, or Firm* — Eric J. Robinson; Robinson Intellectual Property Law Office, P.C.

(57) ABSTRACT

A vehicle (12) starts from the front of a home (11*a*) and moves to a destination (11*b*). An area (area__1) with the home (11*a*) at the center is an area where the position of the home (11*a*) is estimated to be easily specified, and a road (13*a*) to be searched is a road required for searching a moving route of the vehicle (12). An in-vehicle device (200) does not transmit position information or the like acquired in the area (area__1) in response to a request of position information from a road side device (100). The in-vehicle device (200) transmits the position information or the like on the vehicle (12) acquired after the vehicle (12) moves out of the area (area__1) to the road side device (100). The position information on the vehicle is transmitted to the road side device by protecting personal information.

1 Claim, 21 Drawing Sheets

FOREIGN PATENT DOCUMENTS

| | | |
|---|---|---|
| EP | 1 309 212 | 5/2003 |
| JP | 08-210866 | 8/1996 |
| JP | 2000-106689 | 4/2000 |
| JP | 2003-143633 | 5/2003 |
| JP | 2003-228798 | 8/2003 |
| JP | 2003-525459 | 8/2003 |
| JP | 2003-284124 | 10/2003 |
| WO | WO 01/65522 | 9/2001 |

OTHER PUBLICATIONS

International Preliminary Examination Report (Application No. PCT/JP2007/074135) dated Jun. 25, 2009.
Notification of Reason for Refusal (Application No. 2008-549376) dated Nov. 21, 2011.

* cited by examiner

MOBILE BODY POSITION INFORMATION TRANSMITTING DEVICE FOR NAVIGATION SYSTEM, AND MOBILE BODY POSITION INFORMATION TRANSMISSION METHOD AND PROGRAM FOR NAVIGATION SYSTEM

TECHNICAL FIELD

The present invention relates to a mobile body position information transmitting device for a navigation system, and a mobile body position information transmission method and program for a navigation system.

BACKGROUND ART

VICS (Vehicle Information and Communication System) provides drivers with real-time road traffic information including congestion information by using three media of FM multiplex broadcasting, a radio wave beacon, and a light beacon.

There is a system that enables bulk data communications by connecting a radio installation equipped at road side (DSRC (Dedicated Short Range Communications) roadside system) and a DSRC transceiver mounted on a vehicle on a road (DSRC in-vehicle device) by DSRC via a high-speed radio communication line (for example, see Patent Document 1).

There is a navigation system that enables a vehicle to transmit the latitude and longitude of itself to a beacon as position information by connecting thereto using DSRC for the purpose of an OD (Origin and Destination) survey or the like.

Patent Document 1: Japanese Patent Application Laid-Open No. 2001-109989 (page 7, FIG. 1)

DISCLOSURE OF THE INVENTION

Problems to be Solved by the Invention

Such an OD survey, however, requires only statistical information and not a travelling history of an individual user.

On the contrary, if the vehicle transmits the position information to the beacon upon starting from a home on an outward journey or upon returning home on a homeward journey, the home of the vehicle driver is identified, which may lead personal information leakage.

The present invention is adapted in view of the aforementioned conventional problems and intends to provide a mobile body position information transmitting device for a navigation system and a mobile body position information transmission method and program for a navigation system that is capable of protecting personal information.

Means for Solving the Problems

In order to achieve the aforementioned objects, a mobile body position information transmitting device for a navigation system according to a first aspect of the present invention is characterized by including:

position information acquiring means for acquiring position information indicating a current position of a mobile body;

judging means for judging whether the current position acquired by the position information acquiring means is included in an area previously set by a user or not; and transmitting means for receiving a request to transmit the position information acquired by the position information acquiring means from a communication device installed at a roadside, and (a) if the judging means judges that the current position is not included in the area, further transmitting the position information acquired by the position information acquiring means to the communication device, and (b) if the judging means judges that the current position is included in the area, not further transmitting the position information acquired by the position information acquiring means to the communication device.

A mobile body position information transmitting device for a navigation system according to a second aspect of the present invention is characterized by including:

position information acquiring means for acquiring position information indicating a current position of a mobile body;

judging means for judging whether the current position acquired by the position information acquiring means is included in an area previously set by a user or not; and position information storing means for storing the position information acquired by the position information acquiring means, if the judging means judges that the current position is not included in the area; and position information transmitting means for receiving a request to transmit the position information stored in the position information storing means from a communication device installed at a roadside and transmitting the position information stored in the position information storing means to the communication device in response to the request.

Input receiving means for receiving an indication input that specifies a position of the area from the user; and area storing means for storing the area including the position indicated by the indication input received by the input receiving means may be further included, and the judging means may judge whether the current position is included in the area stored in the area storing means or not.

Input receiving means for receiving the indication input that specifies either or both of the area including an origin of the mobile body and the area including a destination of the mobile body; and area storing means for storing either or both of the area including the origin and the area including the destination, wherein the areas are indicated by the indication inputs received by the input receiving means may be further included, and the judging means may judge whether the current position is included in the area including the origin or the area including the destination.

The judging means may judge whether the current position is included in a circular area having a radius of a predetermined distance with the origin at the center or a circular area having a radius of a predetermined distance with the destination at the center.

Area storing means for storing the position of the area; and time measuring means for measuring an elapsed time from when the mobile body started from the position stored in the area storing means up to the present may be further included, and the judging means may further judge whether the elapsed time is longer than a previously set threshold time or not, and the transmitting means may transmit the position information acquired by the position information acquiring means, if the judging means judges that the current position is not included in the area and that the elapsed time is longer than the threshold time.

Area storing means for storing the position of the area; and distance measuring means for measuring a moved distance of the mobile body from the position stored in the area storing means to the current position may be further included, and the judging means may further judge whether the moved distance is longer than a previously set threshold distance or not, and the transmitting means may transmit the position information acquired by the position information acquiring means, if the judging means judges that the current position is not included in the area and that the moved distance is longer than the threshold distance.

Map information storing means for storing map information may be further included, and the judging means may further judge whether the current position is included in the area or not based on the map information stored in the map information storing means and the position information acquired by the position information acquiring means.

The map information storing means may store the map information including an installed position of the communication device, the judging means may further judge whether the current position is within a predetermined range from the installed position of the communication device or not based on the map information, and the transmitting means may transmit the position information acquired by the position information acquiring means, if the judging means judges that the current position is not included in the area and that the current position is within the predetermined range from the installed position.

The map information storing means may store map information including information indicating a road to be searched for a route and the other roads, wherein the road to be searched for a route is a road for searching a moving route of the mobile body, the judging means may further judge whether the mobile body is currently running on the road to be searched for a route or not based on the map information and the current position, and the transmitting means may transmit the position information acquired by the position information acquiring means, if the judging means judges that the current position is not included in the area and that the mobile body is running on the road to be searched for a route.

The map information storing means may store the map information including information indicating the road to be searched for a route wherein the road to be searched for a route is the road for searching the moving route of the mobile body, and may further include traffic information receiving means for receiving traffic information for the road to be searched for a route, the judging means may further judge whether the mobile body has gone into the road to be searched for a route indicated by the traffic information or not based on the map information and the traffic information, and the transmitting means may transmit the position information acquired by the position information acquiring means, if the judging means judges that the current position is not included in the area and that the mobile body has gone into the road to be searched for a route indicated by the traffic information.

The map information storing means may store the map information including information indicating the road to be searched for a route wherein the road to be searched for a route is the road for searching the moving route of the mobile body, and may further include congestion information receiving means for receiving congestion information for the road to be searched for a route, the judging means may further judge whether the road to be searched for a route indicated by the congestion information is included in the moving route of the mobile body or not based on the map information and the congestion information, and the transmitting means may transmit the position information acquired by the position information acquiring means, if the judging means judges that the current position is not included in the area and that the road to be searched for a route indicated by the congestion information is included in the moving route.

The map information storing means may store the map information including information indicating the road to be searched for a route wherein the road to be searched for a route is the road for searching the moving route of the mobile body, a plurality of roads to be searched for a route may be included in the moving route of the mobile body, the judging means may further judge whether each of the road on which the mobile body is currently running and the road on which the mobile body is to run next is any of the plurality of roads to be searched for a route, and the transmitting means may transmit the position information acquired by the position information acquiring means, if the judging means judges that the current position is not included in the area and that the mobile body has gone into the road to be searched for a route on which the mobile body is to run next.

The map information storing means may store the map information including information indicating a residential district and the other districts, and may further include area determining means for calculating residential density based on the map information and determining the size of the area based on the calculated residential density, and the judging means may judge whether the current position is included in the area or not based on the area determined by the area determining means.

Area determining means for determining the size of the area by estimating the residential density based on the number of roads per unit area included in the map information may be further included, and the judging means may judge whether the current position is included in the area or not based on the area determined by the area determining means.

The area determining means may determine a circular area having a radius of a value that monotonously decreases with respect to the magnitude of the residential density with the origin or destination of the mobile body at the center of the circle as the area.

Setup information storing means for storing setup information indicating a plurality of kinds of transmitting timing as timing of transmitting the position information acquired by the position information acquiring means may be further included, and the transmitting means may select the transmitting timing from the plurality of kinds of transmitting timing stored in the setup information storing means according to the setup information selected by the user and transmit the position information at the selected transmitting timing.

The judging means may further judge whether the mobile body has passed a crossroads of a road included in the moving route thereof or not based on the map information and the current position, and the transmitting means may transmit the position information acquired by the position information acquiring means, if the judging means judges that the current position is not included in the area and that the mobile body has passed the crossroads.

Time keeping means for keeping time may be further included, and the judging means may further judge whether an amount of change in the position of the mobile body per unit time is a predetermined amount or less by calculating the amount of change based on the time kept by the time keeping means and the position information acquired by the position information acquiring means, and the transmitting means may transmit the position information acquired by the position information acquiring means, if the judging means judges that the current position is not included in the area and that the amount of change is the predetermined amount or less.

A sensor for sensing whether a brake of the mobile body is being actuated or not may be further included, and the judging means may further judge whether the sensor has sensed that the brake is actuated or not, and the transmitting means may transmit the position information acquired by the position information acquiring means, if the judging means judges that the current position is not included in the area and that the brake is actuated has been sensed.

Time keeping means for keeping time, and time storing means for storing the time kept by the time keeping means when a power supply of the mobile body position information transmitting device is turned on may be further included, and the judging means may further judge whether an elapsed time from the time of previous turning on of the power supply that is stored in the time storing means up to the time of turning on of the power supply of this time is a predetermined time or longer by calculating the elapsed time, and the transmitting means may be adapted to transmit the position information acquired by the position information acquiring means if the elapsed time is shorter than the predetermined time, and not to transmit the position information acquired by the position information acquiring means in the otherwise cases.

Map information storing means for storing map information may be further included, and the judging means may further judge whether a predetermined traffic point is within a predetermined range from the origin of the mobile body or not based on the map information, and the transmitting means may calculate a new predetermined time by adding a predetermined extra time to the predetermined time if the judging means judges that the traffic point is within the range, and may transmit the position information if the elapsed time is the calculated new predetermined time or longer.

A mobile body position information transmission method according to a third aspect of the present invention is characterized by including:

position information acquiring step of acquiring position information indicating a current position of a mobile body;

judging step of judging whether a current position acquired by the position information acquiring step is included in an area previously set by a user or not; and transmitting step of receiving a request to transmit the position information acquired in the position information acquiring step, and (a) if the judging step performs to judge that the current position is not included in the area, transmitting the position information acquired in the position information acquiring step to a communication device, and (b) if the judging means judges that the current position is included in the area, not transmitting the position information acquired by the position information acquiring means.

A mobile body position information transmission method according to a fourth aspect of the present invention is a mobile body position information transmission method executed by a mobile body position information transmitting device having storing means, characterized by including:

a position information acquiring step of acquiring position information indicating a current position of a mobile body;

a judging step of judging whether the current position acquired by the position information acquiring step is included in an area previously set by a user or not; and a position information storing step of storing the position information acquired by the position information acquiring step, if the judging step judges that the current position is not included in the area; and a transmitting step of receiving a request to transmit the position information stored in the storing means and transmitting the position information stored in the storing means in response to the request.

A program according to a fifth aspect of the present invention is characterized by causing a computer to function as:

position information acquiring means for acquiring position information indicating a current position of a mobile body;

judging means for judging whether the current position acquired by the position information acquiring means is included in an area previously set by a user or not; and transmitting means for receiving a request to transmit the position information acquired by the position information acquiring means from a communication device installed at a roadside, and (a) if the judging means judges that the current position is not included in the area, transmitting the position information acquired by the position information acquiring means to the communication device, and (b) if the judging means judges that the current position is included in the area, not transmitting the position information acquired by the position information acquiring means to the communication device.

A program according to a sixth aspect of the present invention is characterized by causing a computer to function as:

position information acquiring means for acquiring position information indicating a current position of a mobile body;

judging means for judging whether the current position acquired by the position information acquiring means is included in an area previously set by a user or not; and position information storing means for storing the position information acquired by the position information acquiring means, if the judging means judges that the current position is not included in the area; and position information transmitting means for receiving a request to transmit the position information stored in the position information storing means from a communication device installed at a roadside and transmitting the position information stored in the position information storing means to the communication device in response to the request.

Effect of the Invention

According to the present invention, personal information can be protected.

Figure 1:
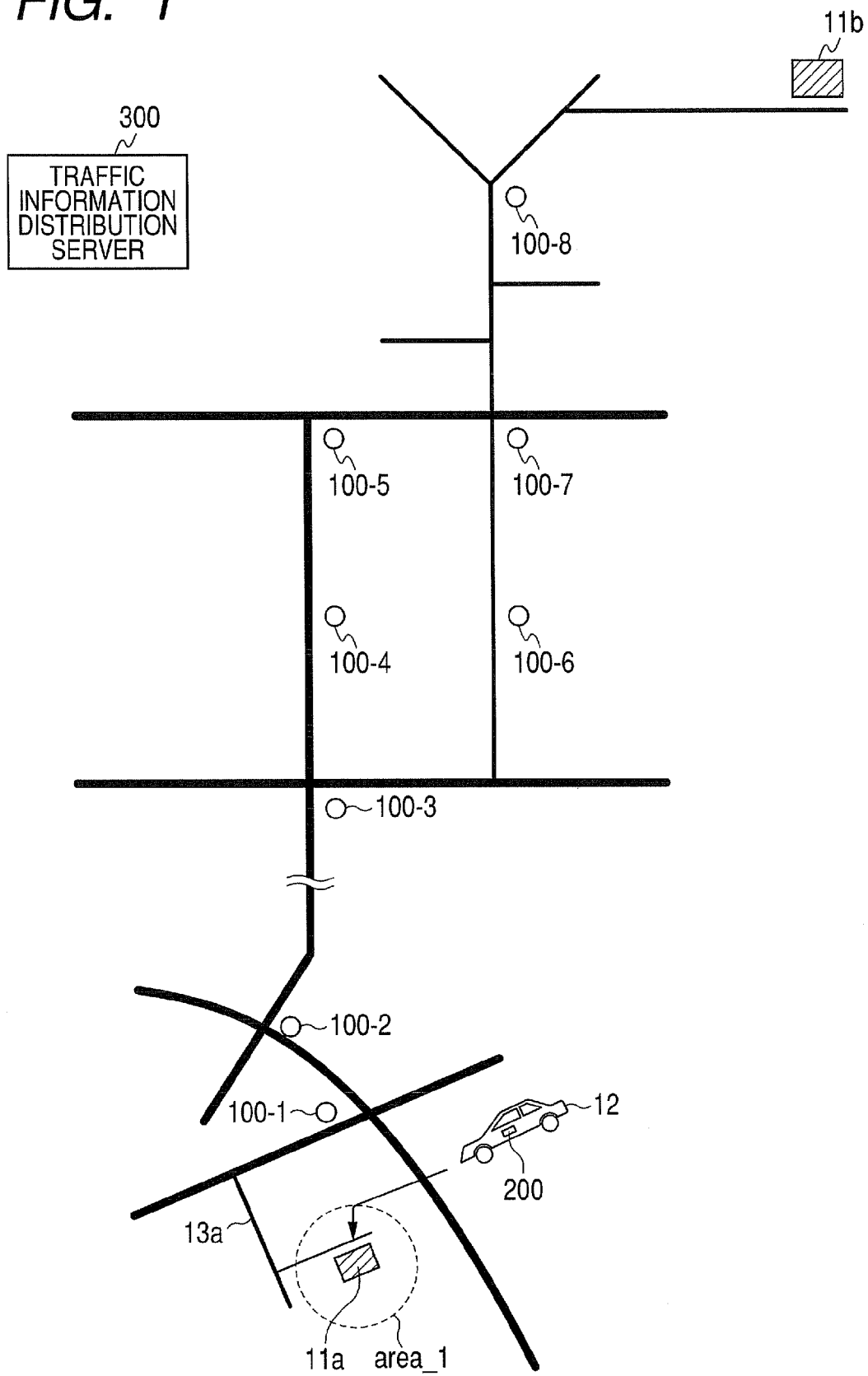
FIG. 1 is a block diagram showing the configuration of an ITS system according to a first embodiment of the present invention.

DESCRIPTION OF SYMBOLS 11a origin (home)
11b destination
12 vehicle
13 road to be searched
100 road side device
101 radio communication part
102 communication control part
103 storage unit
104 control part
105 ROM
106 RAM
107 system bus
200 in-vehicle device
201 communication part
202 voice processing part
203 output part
204 operation part
205 I/O device
206 storage unit
207 time measuring part
208 control unit
209 ROM
210 RAM
255 group of sensors
300 traffic information distribution server

BEST MODES FOR CARRYING OUT THE INVENTION

A mobile body position information transmitting device for a navigation system according to embodiments of the present invention will be described below with reference to the drawings. Here, in the embodiments, ITS (Intelligent Transport Systems) systems will be taken as an example.

First Embodiment

As shown in FIG. 1, the ITS system has road side devices 100 (in the embodiment, the road side devices 100-1 to 100-8), an in-vehicle device 200, and a traffic information distribution server 300.

The in-vehicle device 200, as to be described later, acquires position information indicating the current position thereof by using GPS (Global Positioning System). The in-vehicle device 200 transmits the position information acquired and time information indicating the time when the position information was acquired to the road side devices 100.

Here, the in-vehicle device judges whether or not to transmit the position information and time information to the road side devices 100 according to the place where it acquired those kinds of information. That is, the in-vehicle device 200 does not transmit the position information and time information that it acquired in an area area_1 to the road side devices 100, and transmits the position information and time information that it acquired in the other areas to the road side devices 100. For example, the area area_1 is within a circle having a predetermined radius with an origin 11a of a vehicle 12 at the center. Since the origin 11a is highly possible a place that can identify an individual such as a user's home, it is adapted not to transmit the position information and time information on the vehicle 12 that were acquired in the area area_1 to protect the personal information. In the embodiment, the area area_1 is indicated within a circle with a predetermined radius, and the radius of the circle may be a variable value. Further details will be described later. The area area_1 needs not be a circle and may be represented as another arbitrary graphic.

Each of the road side devices 100, which is formed of a so-called radio beacon, light beacon or the like and disposed in the vicinity of a road, in a parking lot, or the like, transmits traffic information distributed by the traffic information distribution server 300 to the in-vehicle device 200 on the vehicle 12 that is passing nearby.

Also, the road side device 100 requires the in-vehicle device 200 to transmit the position information and time information on the vehicle 12 for the purpose of an OD survey. The OD survey surveys the origin and destination of movement of the vehicle 12 or the like. The road side device 100 receives the position information or the time information from the in-vehicle device 200. As mentioned above, the road side device 100 functions as a communication apparatus for transmitting and receiving various kinds of information to and from the in-vehicle device 200.

Then, the road side device 100 transmits the position information on the vehicle 12 that is received from the in-vehicle device 200 to the traffic information distribution server 300. The traffic information distribution server 300 generates data that will make reference material for creating transportation planning and the like by performing a statistical process based on the position information and time information received from the road side device 100. The use of the data stored in the traffic information distribution server 300 is not limited by the present invention.

Figure 2:
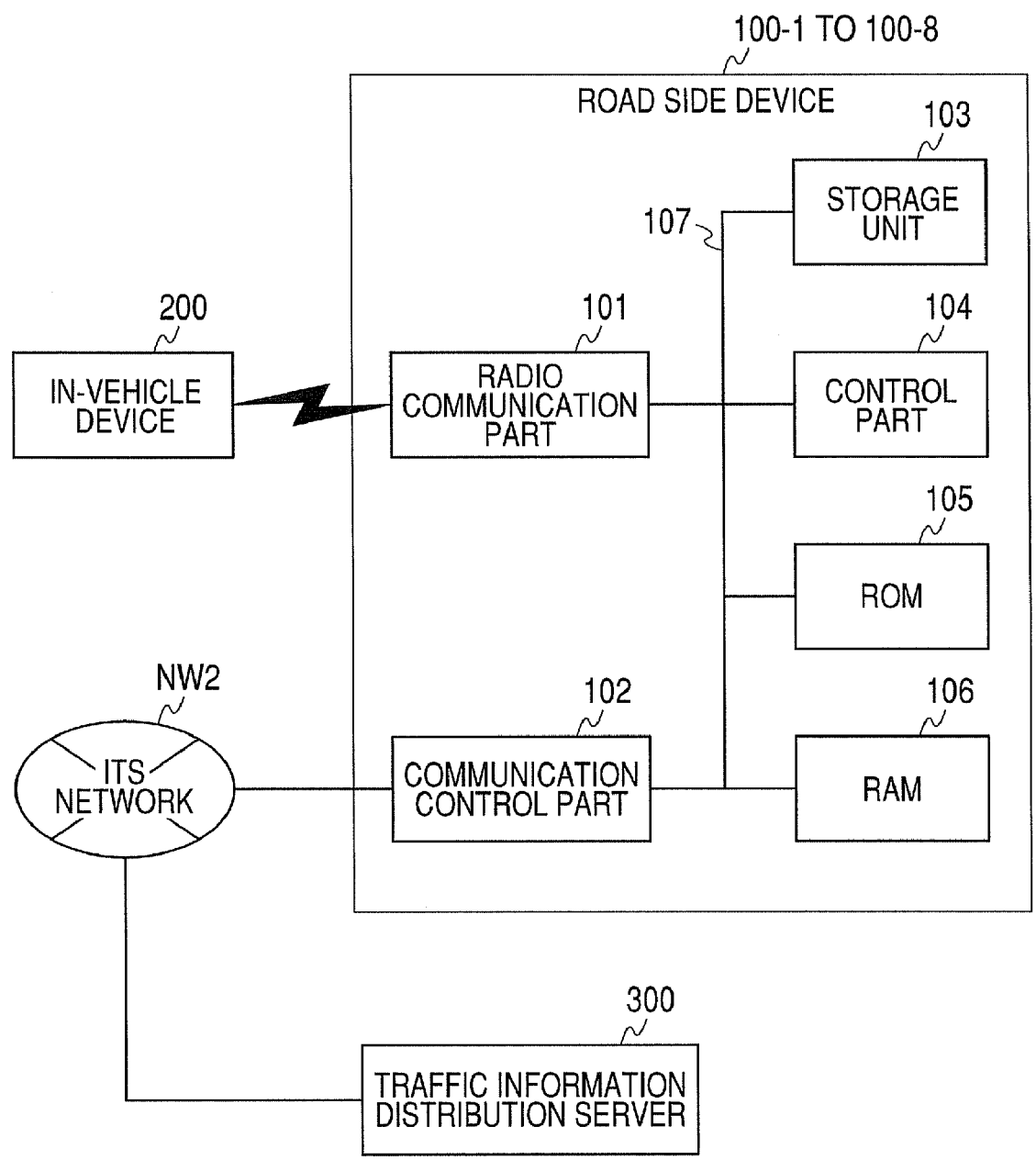
FIG. 2 is a block diagram showing the configuration of a road side device.

Now, the configuration of the road side device 100 will be described. As shown in FIG. 2, the road side device 100 has a radio communication part 101, a communication control part 102, a storage unit 103, a control part 104, a ROM (Read Only Memory) 105, a RAM (Random Access Memory) 106, and a system bus 107.

The radio communication part 101, the communication control part 102, the storage unit 103, the control part 104, the ROM 105, and the RAM 106 are connected one another via the system bus 107 and transfer an instruction and data one another.

The radio communication part 101 transmits and receives information to and from the in-vehicle device 200 installed in the vehicle 12 that is passing by the road side device 100. The radio communication part 101 transmits, for example, the traffic information provided by the traffic information distribution server 300 to the in-vehicle device 200. In addition, the radio communication part 101 receives a vehicle ID, the position information, time information, and the like that are transmitted from the in-vehicle device 200. The vehicle ID is information for identifying the in-vehicle device 200. With that, the road side device 100 can acquire data indicating which vehicle is present at which place at what time.

The communication control part 102 is connected with the traffic information distribution server 300 via an ITS network NW2 and receives the traffic information transmitted from the traffic information distribution server 300. The communication control part 102 provides information acquired by itself to the traffic information distribution server 300.

The storage unit 103 stores the traffic information received from the traffic information distribution server 300 and the traffic information specific to itself. In addition, the storage unit 103 stores such information as the vehicle ID, the position information, the time information, or the like that have been acquired by the radio communication part 101.

The control part 104 is formed of a CPU (Central Processing Unit) and the like and controls operation of the entire road side device 100. For example, the control part 104 provides the traffic information stored in the storage unit 103 for the radio communication part 101 to make it transmit the traffic information. In addition, the control part 104 makes the storage unit 103 store the information that is acquired from the in-vehicle device 200 via the radio communication part 101.

Also, the control part 104 transmits the information, which has been acquired from the in-vehicle device 200 and is stored in the storage unit 103, to the traffic information distribution server 300 via the communication control part 102 and the ITS network NW2. In addition, it makes the storage unit 103 store the traffic information or the like that is acquired from the traffic information distribution server 300 via the communication control part 102.

The ROM 105 stores an operating system (OS) which is required for controlling operation of the entire road side device 100, various programs and data.

The RAM 106 functions as a work area for the control part 104.

Now, the configuration of the in-vehicle device 200 will be described. The in-vehicle device 200 of the embodiment is a navigation system installed in the vehicle 12, and integrated into a car navigation apparatus, for example. As well as the general car navigation functions, it has a function of playing and reporting the traffic information transmitted from the road side device 100.

Further, the in-vehicle device 200 has a function of transmitting the latitude and longitude of the vehicle 12 to the road side device 100 as the position information for such purposes of OD survey and the like. Also, the in-vehicle device 200 has a function of controlling transmitting timing of the acquired position information or the like for the purpose of protecting the personal information. In the description below, the origin of the vehicle 12 is considered as the user's home by representing the "origin 11a" as the "home 11a" for easier understanding of the present invention.

Figure 3:
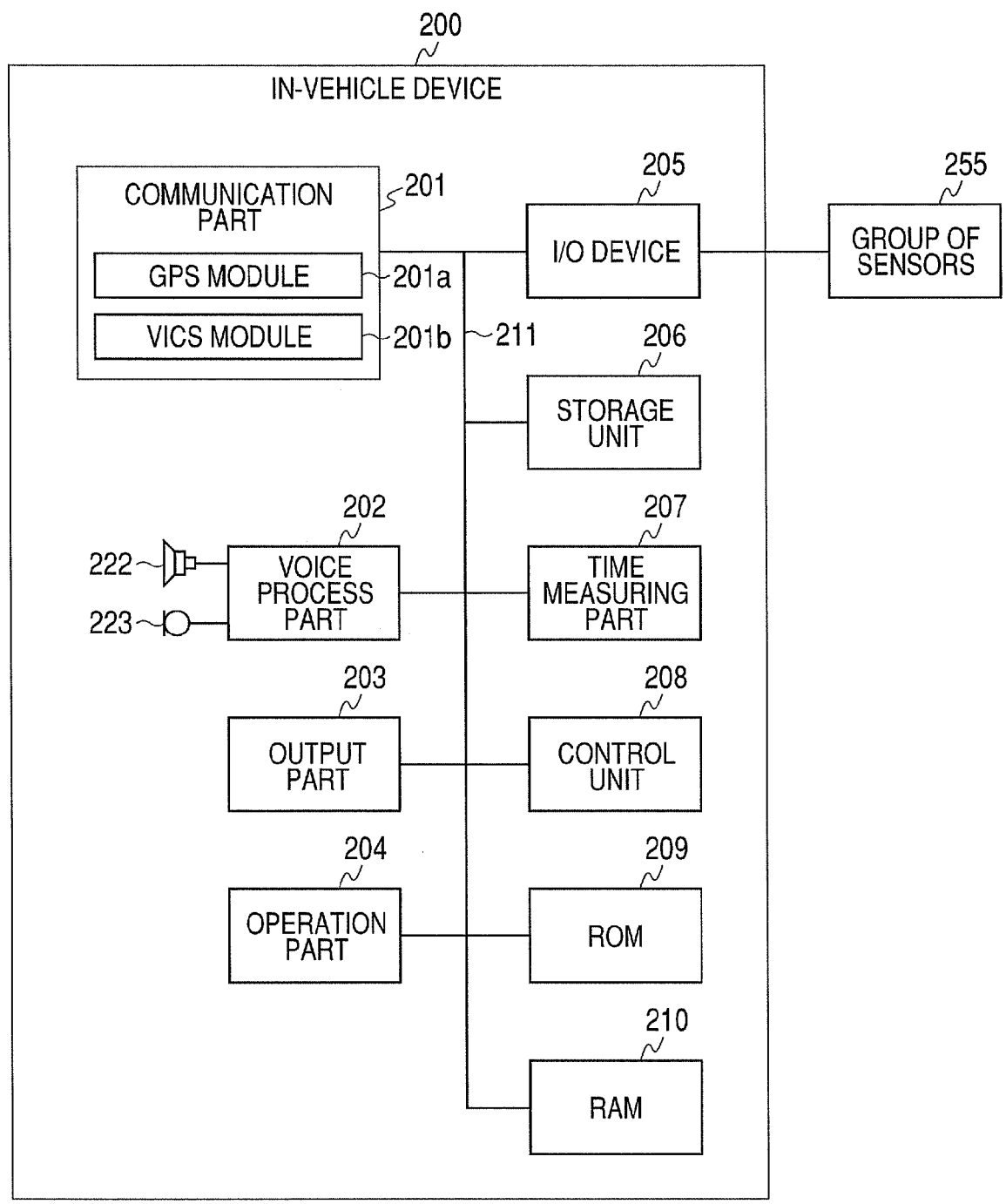
FIG. 3 is a block diagram showing the configuration of an in-vehicle device.

As shown in FIG. 3, the in-vehicle device 200 has the communication part 201, a voice processing part 202, an output part 203, an operation part 204, an I/O device 205, the storage unit 206, a time measuring part 207, a control unit 208, the ROM 209, the RAM 210, and the system bus 211.

The communication part 201, the voice processing part 202, the output part 203, the operation part 204, the I/O device 205, the storage unit 206, the time measuring part 207, the control unit 208, the ROM 209, and the RAM 210 are connected one another via the system bus 211 and transfer an instruction and data.

The communication part 201 includes a GPS module 201a and a VICS (Vehicle Information and Communication System) module 201b.

The GPS module 201a receives GPS radio waves from a plurality of GPS satellites at predetermined timing and supplies the GPS signals (positioning data) acquired to the control unit 208.

The VICS module 201b communicates with the road side device 100 over the DSRC (Dedicated Short Range Communication) system.

The voice processing part 202 converts digital audio signals input from the control unit 208 into analog audio signals by a D/A converter (not shown) and outputs to a speaker 222. Also, the voice processing part 202 converts voices input from a microphone 223 into digital audio signals by an A/D converter (not shown) and inputs to the control unit 208. That allows the user to listen to navigation voices and input voices.

The output part 203 has a monitor device of a LCD (Liquid Crystal Display) or the like and displays navigation images or TV images acquired by the communication part 101 or map images previously stored in the storage unit 206.

The operation part 204 is formed of a touch panel-equipped input device or the like, and generates indication input signals based on indication inputs by the user and inputs the signals to the control unit 208.

The I/O device 205 includes a DVD-ROM (Digital Versatile Disk-Read Only Memory) drive, and reads out data from a DVD-ROM or a CD-ROM that stores predetermined map information and inputs the information to the control unit 208.

Also, the I/O device 205 acquires detection signals sent from a group of sensors 225 including a speed sensor, a running distance sensor, a direction sensor, a brake sensor and the like and supplies the signals to the control unit 208.

Further, the I/O device 205 has a card reader (not shown) that reads out recorded data of an ID card. When the ID card is inserted into the card reader, the I/O device 205 receives an input of the vehicle ID recorded on the ID card and supplies the vehicle ID to the control unit 208.

The storage unit 206 includes a hard disk drive (HDD) and stores various kinds of information such as map information (map data) including information on the road to be searched. The storage unit 206 may have other memories such as a memory card. The control unit 208 reads out the map information from such a storage medium as the DVD-ROM that records the map information via the I/O device 205 and previously writes the information in the storage unit 206. The road to be searched refers to a road that is to be searched for a moving route of the vehicle 12 when the in-vehicle device 200 navigates the moving route.

The time measuring part 207 is for measuring a running time after the vehicle 12 started from the home 11*a*. The time measuring part 207 supplies the measured running time and the current time information to the control unit 208. The time measuring part 207 is also capable of measuring a running time between other arbitrary spots.

The control unit 208 is formed of the CPU (Central Processing Unit), an ECU (Electronic Control Unit) and the like and controls operation of the entire in-vehicle device 200. The control unit 208 may also have a coprocessor and the like.

For example, the control unit 208 acquires the position information on the vehicle 12 (the in-vehicle device 200) based on the GPS signals received via the GPS module 201*a*. The position information is data that represents the position of the vehicle 12 that has the in-vehicle device 200 mounted thereon by the latitude and longitude.

In addition, the control unit 208 captures an output from the direction sensor included in the group of sensors 225 via the I/O device 205, and determines the current traveling direction of the vehicle 12. The control unit 208 also acquires the running distance $L_x$ from the home 11*a* based on the detection signals of the running distance sensor. The control unit 208 also determines whether the brake (here, referring to a parking brake or a side brake) of the vehicle 12 is actuated or not based on the detection signals from the brake sensor.

In addition, the control unit 208 refers to the map information stored in the storage unit 206 and prevents the storage unit 206 from storing the position information acquired in the area area_1 so as to stop transmitting the position information in the area area_1.

Figure 4:
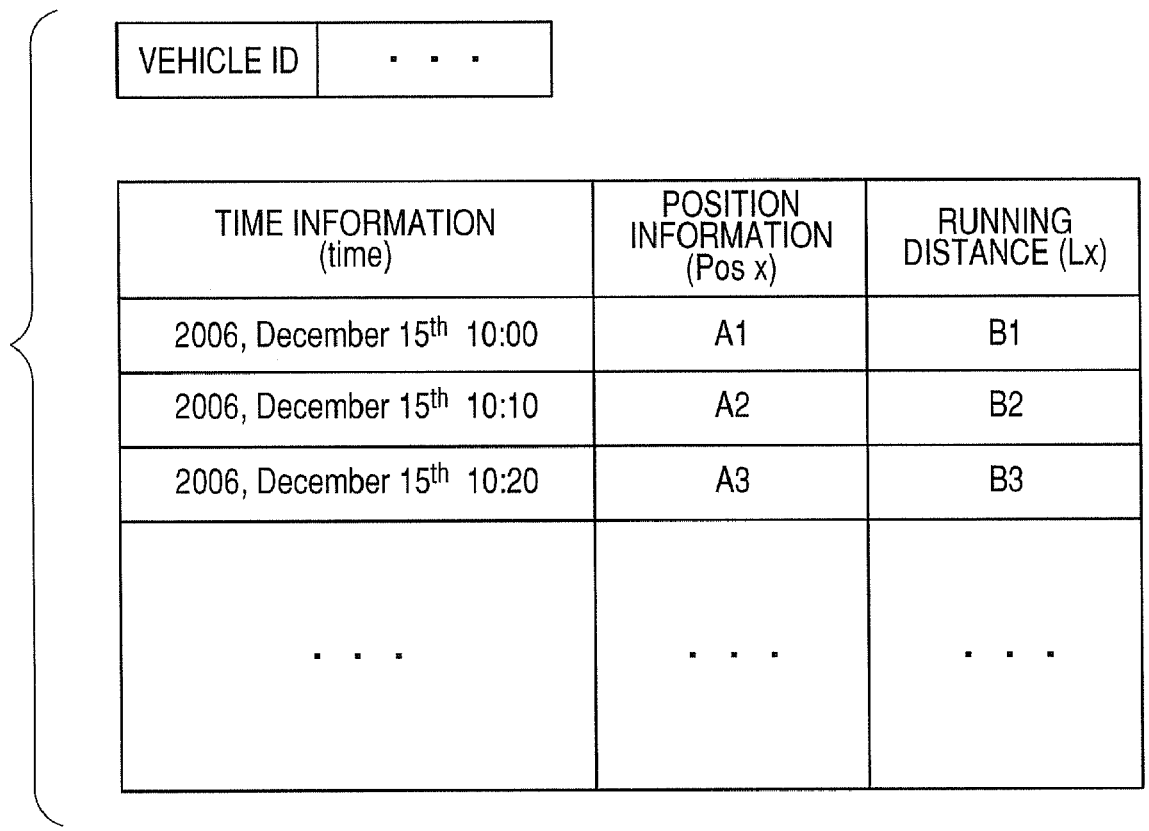
FIG. 4 is a table showing information stored in a storage unit.

Then, the control unit 208 acquires the time information time from the time measuring part 207 and, as shown in FIG. 4, makes the storage unit 206 store the vehicle ID supplied from the I/O device 205, the time information time, and the position information Pos_x on the vehicle 12 in association with one another.

The control unit 208 may make the storage unit 206 store the acquired position information, time information or the like without regard of the place the information has been acquired for. In that case, however, the control unit 208 does not transmit the information acquired in the area area_1 to the road side device 100.

In addition, the control unit 208 receives the traffic information from the road side device 100 via the VICS module 201*b* and plays it based on play timing control data (parameters) included in the received traffic information. That is, the control unit 208 is not only capable of making various kinds of information transmitted from the road side device 100 serially output to the output part 203 but also capable of making certain information output at a predetermined time or predetermined timing.

Further, when a request to transmit the position information Pos_x on the vehicle 12 is issued from the nearby road side device 100 out of the area area_1, the control unit 208 reads out the vehicle ID, the position information Pos_x and time information time on the vehicle 12 from the storage unit 206 and supplies them to the VICS module 201*b* of the communication part 201. Then, the control unit 208 makes the vehicle ID, the position information Pos_x, and the time information time transmitted to the road side device 100 in association with one another. The position information Pos_x and time information time are used for the OD survey and the like as set forth.

As described above, the control unit 208 does not transmit the position information Pos_x on the vehicle 12 that has been acquired by the GPS module 201*a* in the area area_1 in order to protect the personal information.

When the vehicle 12 goes out from the area area_1, the control unit 208 transmits the position information Pos_x and time information time on the vehicle 12 that have been acquired by the GPS module 201*a* thereafter in association with one another. It is needless to say that it neither transmits the information when the vehicle 12 goes into the area area_1 again. A plurality of methods can be considered as a method for setting up such transmitting timing.

First, the first method is a method for transmitting the position information Pos_x to the road side device 100 after going into the road to be searched. In the description below, it is assumed that the vehicle 12 starts from the home 11*a* as the origin and moves to the destination 11*b* as shown in FIG. 1.

Figure 5:
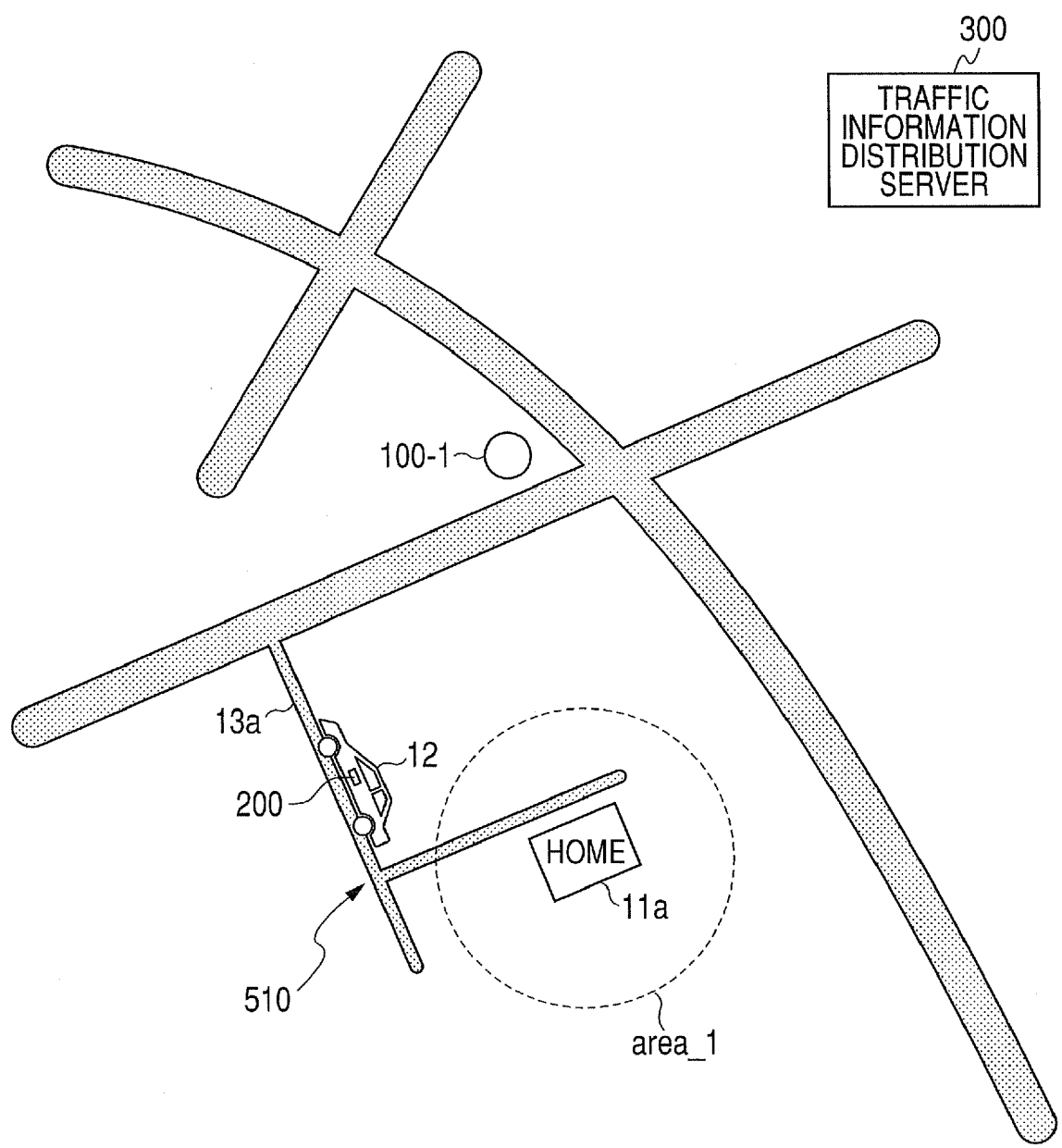
FIG. 5 is a diagram showing a first method for a control unit to set up transmitting timing of position information.

As shown in FIG. 5, the road to be searched 13*a* is out of the area area_1 and is for searching the moving route of the vehicle 12. After the vehicle 12 goes into the road to be searched 13*a*, the control unit 208 makes the position information Pos_x and time information time on the vehicle 12 that have been acquired by the GPS module 201*a* to the road side device 100 in association with one another. Before the vehicle 12 goes into the road to be searched 13*a*, i.e., before the vehicle 12 goes into the road to be searched 13*a* from the home 11*a* at a crossroads 510, the control unit 208 does not transmit the kinds of information.

Here, the control unit 208 estimates the residential density based on the number of roads per unit area for the size of the area area_1 (in the embodiment, the radius of the circle). By comparing a metropolitan area type having a high residential density with a depopulated area type having one residence per several kilometers or the like, the metropolitan area type having a high residential density has also high road density for the same number of roads. Therefore, it narrows the area area_1. On the other hand, the depopulated area type having low residential density has also low road density. Therefore, it widens the area area_1. In either case, the area area_1 is set based on whether the home 11*a* can be easily located or not.

In other words, the control unit 208 decreases the radius of the circle of the area area_1 if the residential density near the home 11*a* is high, and increases the radius of the circle of the area area_1 if the residential density near the home is low. The radius of the circle monotonously decreases with respect to (typically, inversely proportional to) the residential density.

When the area area_1 is represented by an arbitrary graphic of a shape other than a circle, the control unit 208 sets the area area_1 so that the area of the area area_1 monotonously decreases with respect to the residential density.

Figure 6:
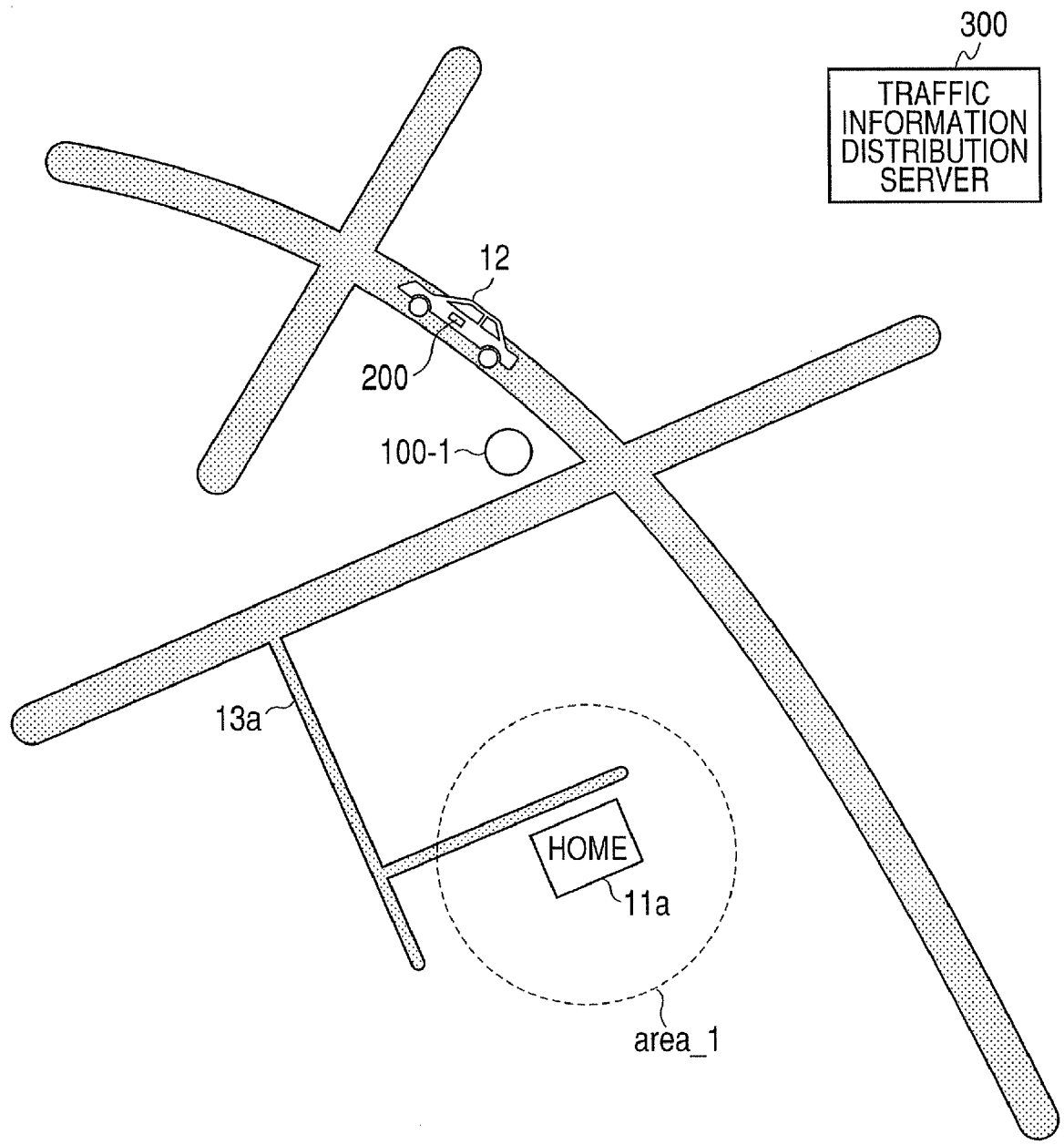
FIG. 6 is a diagram showing a second method for the control unit to set up the transmitting timing of the position information.

The second method is a method for transmitting the position information Pos_x on the vehicle 12 that has been acquired by the GPS module 201a upon passing the front of the road side device 100 to the road side device 100. As shown in FIG. 6, when the vehicle 12 passes the front of the road side device 100, the control unit 208 makes the position information Pos_x and time information time on the vehicle 12 that have been acquired by the GPS module 201a to the road side device 100 in association with one another. That is, the control unit 208 judges whether the current position of the vehicle 12 is within a predetermined range from the road side device 100 or not, and if it judges that the current position is within the predetermined range, it transmits the information to the road side device 100.

The third method is a method for transmitting the position information Pos_x or the like when the elapsed time from when the vehicle 12 started the home 11a up to the present exceeds the threshold time that is previously set for judging whether the vehicle 12 goes out from the area area_1 or not, i.e., after it is judged that the vehicle 12 is out of the area area_1.

Figure 7:
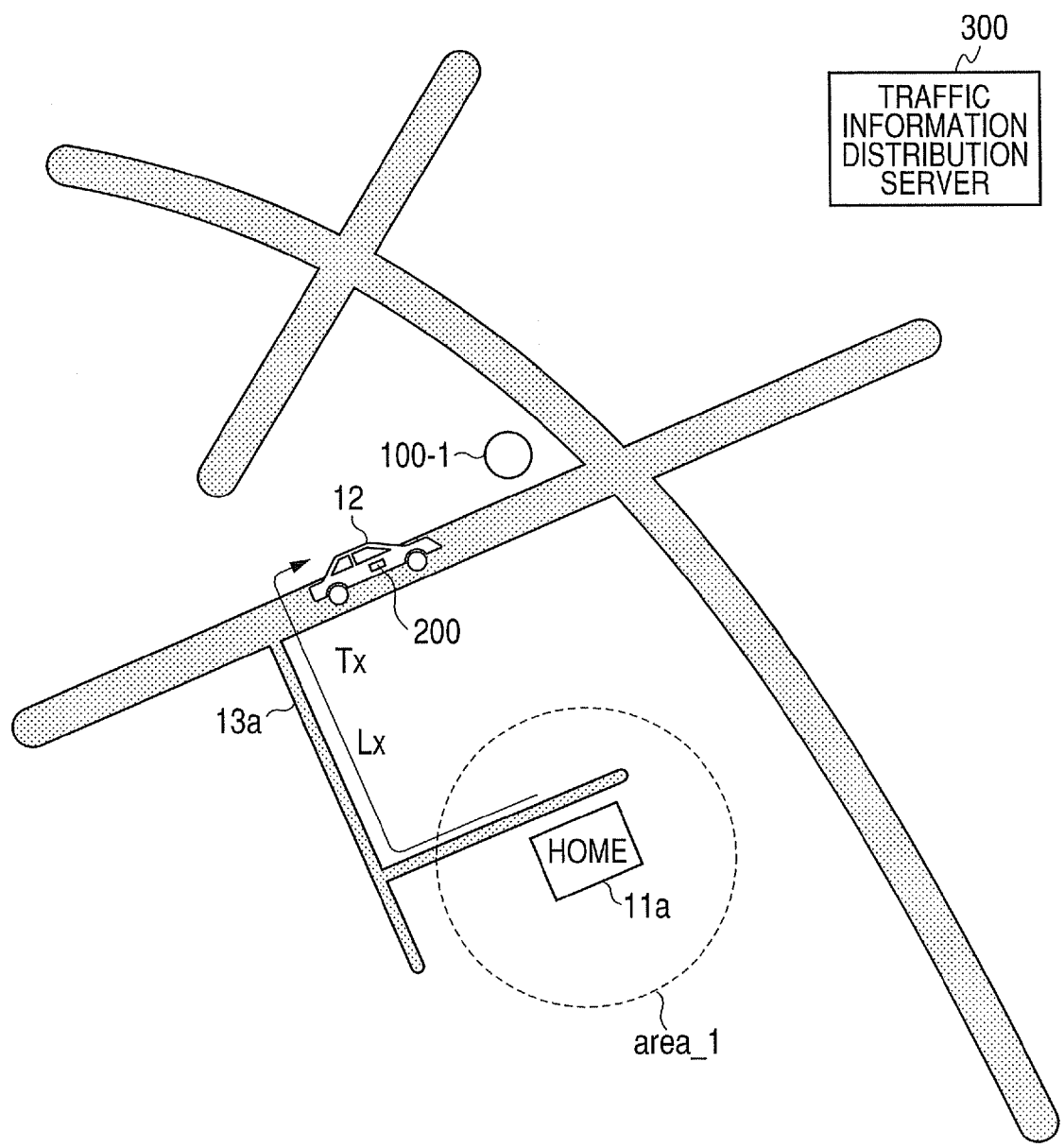
FIG. 7 is a diagram showing third and fourth methods for the control unit to set up the transmitting timing of the position information.

The control unit 208 acquires the elapsed time measured by the time measuring part 207. When the elapsed time $T_x$ exceeds the previously set threshold time T_th as shown in FIG. 7, the control unit 208 determines that the vehicle 12 goes out from the area area_1. Then, after the time it is determined that the vehicle 12 goes out from the area area_1, the control unit 208 makes the position information Pos_x and time information time on the vehicle 12 that have been acquired by the GPS module 201a to the road side device 100 in association with one another. The ROM 209 or the storage unit 206 previously stores the threshold time T_th, and the control unit 208 reads out it for the determination as required.

The fourth method is a method for transmitting the position information Pos_x from the position where it is judged that the vehicle 12 is out of the area area_1 when the running distance from when the vehicle started the home 11a up to the current position exceeds the threshold distance that is previously set for determining whether the vehicle 12 has passed the area area_1 or not.

The control unit 208 acquires the running distance $L_x$ from when the vehicle 12 started the home 11a that is measured by the running distance sensor of the group of sensors 225, via the I/O device 205. When the running distance $L_x$ exceeds the threshold distance L_th that is previously set for determining whether the vehicle 12 goes out from the area area_1 or not as shown in FIG. 7, the control unit 208 determines that the vehicle 12 has gone out from the area area_1. The ROM 209 or the storage unit 206 previously stores the threshold distance L_th, and the control unit 208 reads out it for the determination as required.

Then, in response to the transmission request from the road side device 100, the control unit 208 transmits the position information Pos_x and time information time that have been acquired by the GPS module 201a to the road side device 100 in association with one another from the position where it is judged that the vehicle 12 has gone out from the area area_1.

Figure 8:
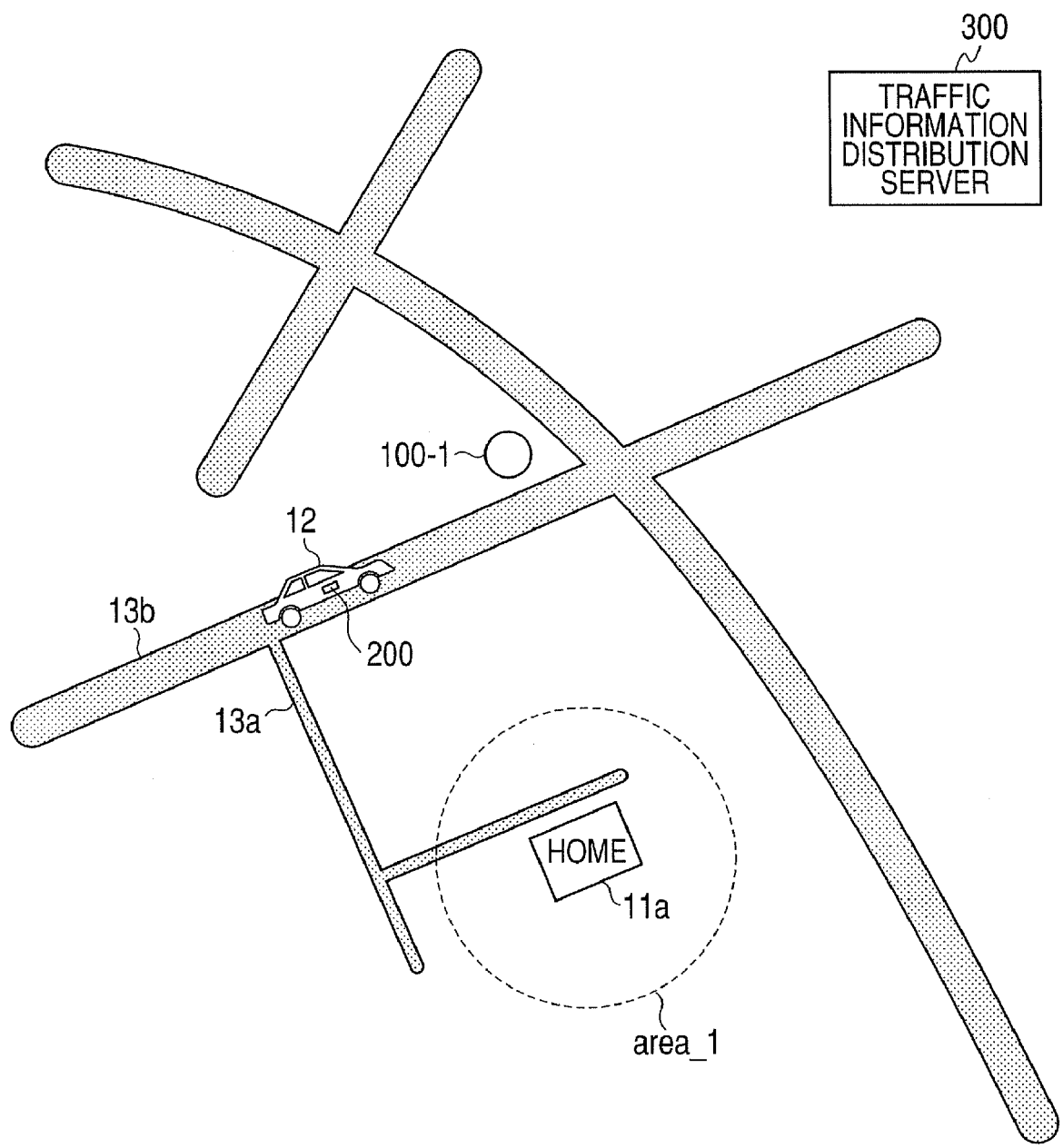
FIG. 8 is a diagram showing a fifth method for the control unit to set up the transmitting timing of the position information.

The fifth method is a method for transmitting the position information Pos_x or the like when the vehicle 12 goes into a road that has the VICS link installed as the road to be provided with the traffic information. For example, the road to be searched 13b has the VICS link installed as a unit of road that is segmented for each main crossroads, while the road to be searched 13a has no VICS link installed as shown in FIG. 8. The VICS link is to be a unit for providing the traffic information by segmenting the road to be searched into segments at crossroads or the like. That means the user can be provided with the traffic information on the road that has the VICS link installed.

After the vehicle 12 goes into the road to be searched 13b, the control unit 208 transmits the position information Pos_x and time information time on the vehicle 12 that have been acquired by the GPS module 201a to the road side device 100 in association with one another.

Figure 9:
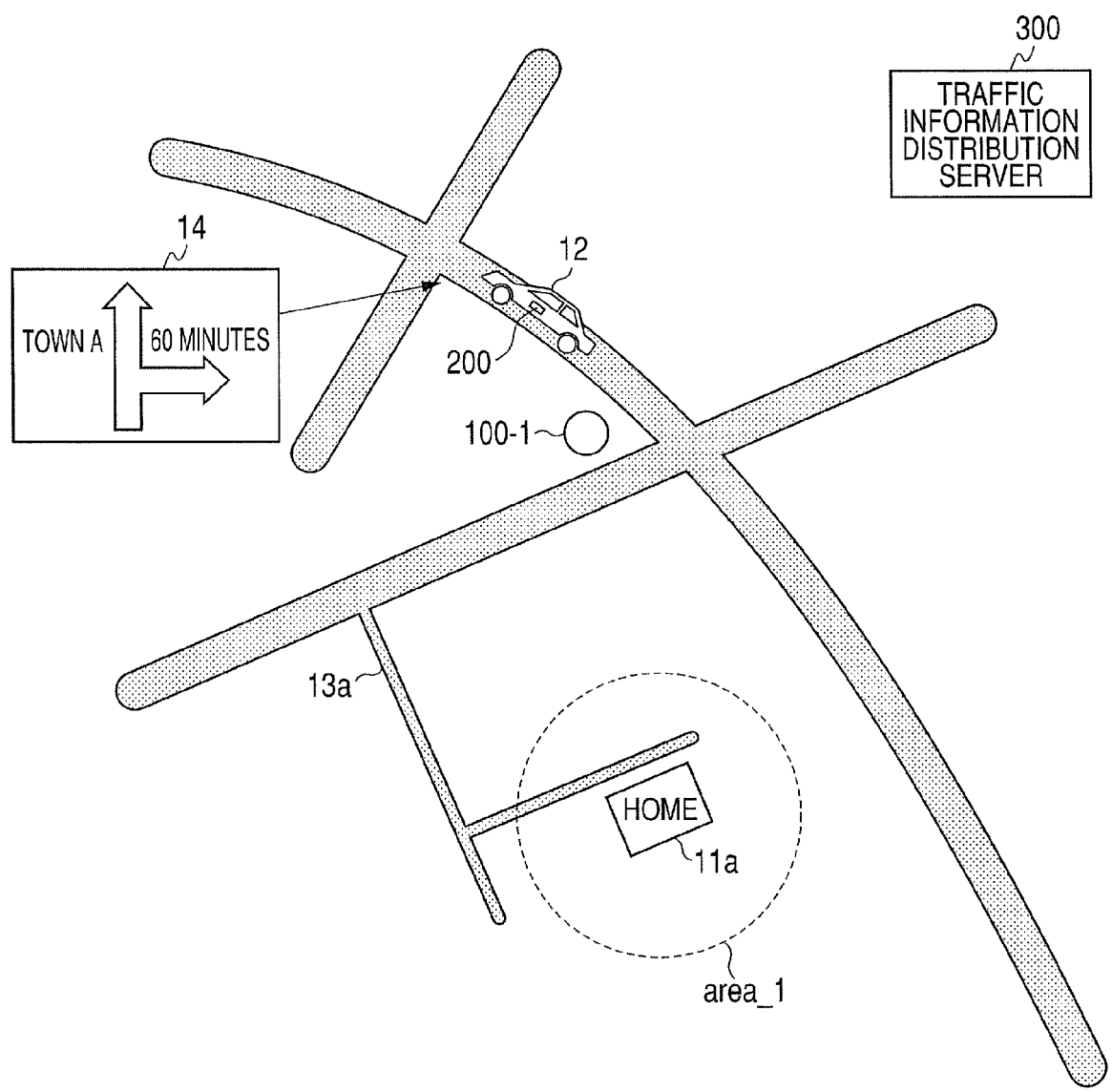
FIG. 9 is a diagram showing a sixth method for the control unit to set up the transmitting timing of the position information.

The sixth method is a method for transmitting the position information Pos_x on the vehicle 12 after congestion information is supplied to the in-vehicle device 200. Congestion conditions differ for each area that has the road side device 100 installed. The control unit 208 judges whether the vehicle 12 is at the position where it is supplied with the congestion information or not (i.e., whether the vehicle 12 is on the road congested or not). Then, the control unit 208 transmits to the road side device 100 the position information Pos_x and time information time that have been acquired by the GPS module 201a after the congestion information was supplied as shown in FIG. 9 in association with one another.

Figure 10:
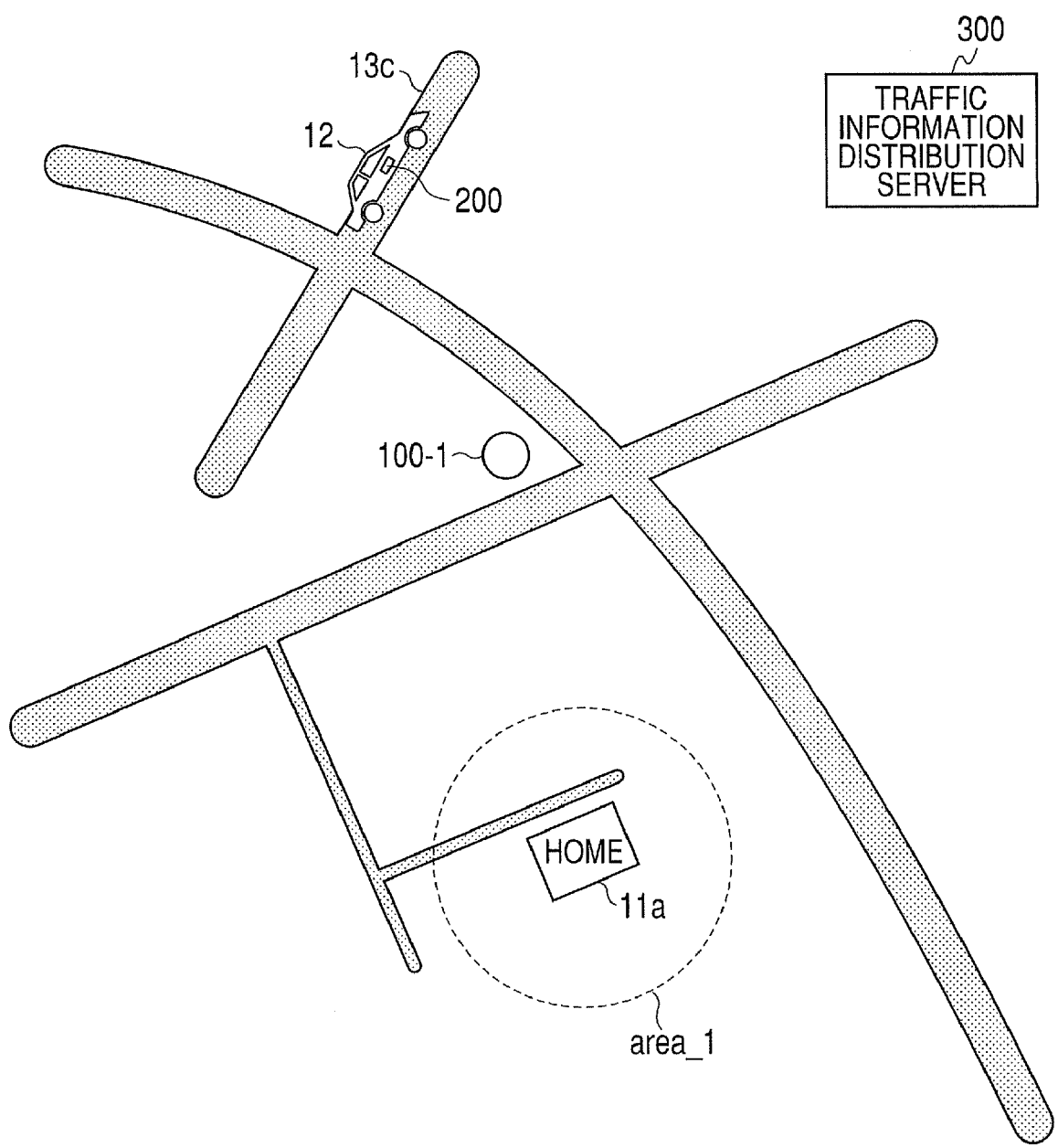
FIG. 10 is a diagram showing a seventh method for the control unit to set up the transmitting timing of the position information.

The seventh method is a method for transmitting the position information Pos_x from the next road to be searched. As shown in FIG. 10, the road to be searched 13c is the next road to be searched the vehicle 12 has further gone into after it went into the road to be searched 13a. The next road to be searched means the road to be searched of a different road type or the road to be searched of the same road type after passing one or more crossroads.

The control unit 208 determines the road to be searched that the vehicle 12 is currently running on based on the map information, and transmits the position information Pos_x and time information time on the vehicle 12 that have been acquired by the GPS module 201a after the vehicle 12 went into the next road to be searched 13c to the road side device 100 in association with one another.

When the vehicle 12 moves from the destination 11b to the home 11a, the control unit 208 neither transmits the position information Pos_x and time information time on the vehicle 12 that have been acquired by the GPS module 201a in the area area_1.

The control unit 208 also performs the same process for the destination 11b. That is, the control unit 208 sets up an area area_2 with the destination 11b at the center (an area for easily determining the destination 11b) so as not to transmit the position information Pos_x and time information time on the vehicle 12 that have been acquired by the GPS module 201a in the area area_2.

The ROM 209 stores an operating system (OS) program that is required for controlling operation of the entire in-vehicle device 200 and various kinds of data.

The ROM 209 stores programs for executing transmitting processes by the methods exemplified by the first method to the seventh method, for example, as the setup information for setting up the transmitting timing of the position information Pos_x and time information time on the vehicle 12. When any of the first method to the seventh method is specified, the control unit 208 reads out the program for the specified method.

Then, the control unit 208 sets up the timing of transmitting the position information Pos_x and time information time on the vehicle 12 according to the read out method, and controls to transmit the position information Pos_x and time information time on the vehicle 12 to the road side device 100 at the setup timing in association with one another.

The RAM 210 is for temporarily storing data and a program, and keeps data acquired from the communication part 201, data read out from the DVD-ROM, and the like.

The control unit 208 uses the RAM 210 as the work memory.

The traffic information distribution server 300 is for generating various kinds of traffic information and distributing the generated traffic information for each road side device 100.

The traffic information distribution server 300 determines the congestion conditions based on the position information Pos_x and time information time on the vehicle 12 acquired from each road side device 100.

Then, the traffic information distribution server 300 generates the congestion information based on the determined congestion conditions and distributes the congestion conditions to each road side device 100.

(Transmitting Process of Position Information and the Like)

Now, the operation of the navigation system according to the embodiment will be described. In the embodiment, the in-vehicle device 200 will be described by assuming that the operation part 204 receives an input for the destination of the vehicle 12 (here, the home 11a) from the user and the control unit 208 guides (navigates) through the moving route from the origin to the destination 11b of the vehicle 12.

When the engine of the vehicle 12 is switched on, the GPS module 201a of the in-vehicle device 200 receives the GPS radio waves from a plurality of GPS satellites and the control unit 208 acquires the position information Pos_x on the vehicle 12.

The control unit 208 makes the vehicle ID supplied from the I/O device 205, the time information time acquired from the time measuring part 207, the acquired position information Pos_x on the vehicle 12, and the running distance $L_x$ stored in the storage unit 206.

The vehicle 12 starts from the front of the home 11a and moves toward the destination 11b. The control unit 208 makes the position information stored and accumulated in the storage unit 206 each time when it acquires the position information by the GPS module 201a.

When a request to transmit the position information Pos_x on the vehicle 12 or the like is issued from the nearby road side device 100, the control unit 208 reads out the program for the method specified among the first method to the seventh method from the ROM 209. Then, according to the program, it transmits the position information Pos_x on the vehicle 12 or the like. The control unit 208 receives the input for specifying the method for the transmission from the user in advance and transmits the information in the received method.

Figure 11:
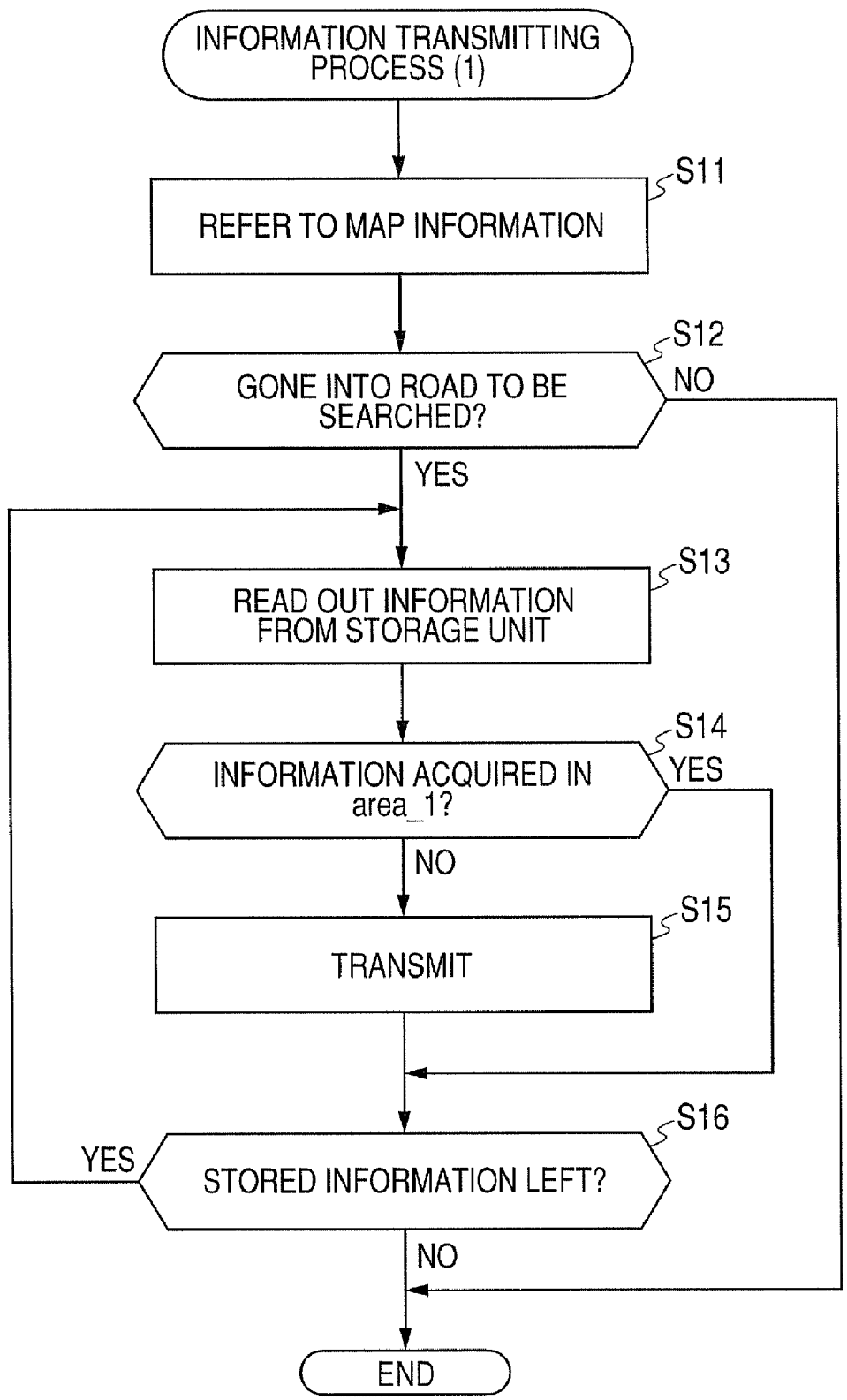
FIG. 11 is a flowchart showing an information transmitting process (1) according to the first method executed by the control unit.

When the first method is specified, the control unit 208 makes the information transmitting process (1) executed according to the flowchart shown in FIG. 11.

The control unit 208 refers to the map information stored in the storage unit 206 (step S11).

The control unit 208 judges whether the vehicle 12 has gone into the road to be searched or not based on the referred map information (step S12).

If the control unit 208 judges that the vehicle has not gone into the road to be searched (step S12; No), it makes the information transmitting process (1) ended.

When the control unit 208 judges that the vehicle 12 has gone into the road to be searched (step S12; Yes), it makes the position information Pos_x on the vehicle 12 and the time information time associated with that position information Pos_x read out from the storage unit 206 (step S13). For example, the control unit 208 makes one piece among the position information Pos_x stored in the storage unit 206 that has not been transmitted to the road side device 100 and has the oldest time information associated acquired.

The control unit 208 judges whether the read out position information Pos_x and time information time were acquired in the area area_1 or not based on the referred map information (step S14).

When the control unit 208 judges that the read out position information Pos_x and time information time on the vehicle 12 were not acquired in the area area_1 (step S14; No), it makes the acquired position information Pos_x and time information time transmitted to the road side device 100 (step S15).

The control unit 208 judges whether information is still left to be read out from the storage unit 206 or not (step S16).

When the control unit 208 judges that information is still left to be read out (step S16; Yes), it makes the process from step S13 to step S16 repeated until all the information is read out.

On the other hand, if the control unit 208 judges that the read out position information Pos_x and time information time on the vehicle 12 were acquired in the area area_1 (step S14; Yes), it does not make the read out position information Pos_x and time information time transmitted. In that case, the control unit 208 may make the position information Pos_x and time information time that are judged to have been acquired in the area area_1 deleted. The deleting timing is not limited to that and may be changed to any timing.

When the control unit 208 judges that all the information has been read out from the storage unit 206 (step S16; No), it makes the information transmitting process (1) ended. The control unit 208 can make the position information Pos_x and time information time deleted from the storage unit 206 deleted, when it has made all the information successfully transmitted.

Figure 12:
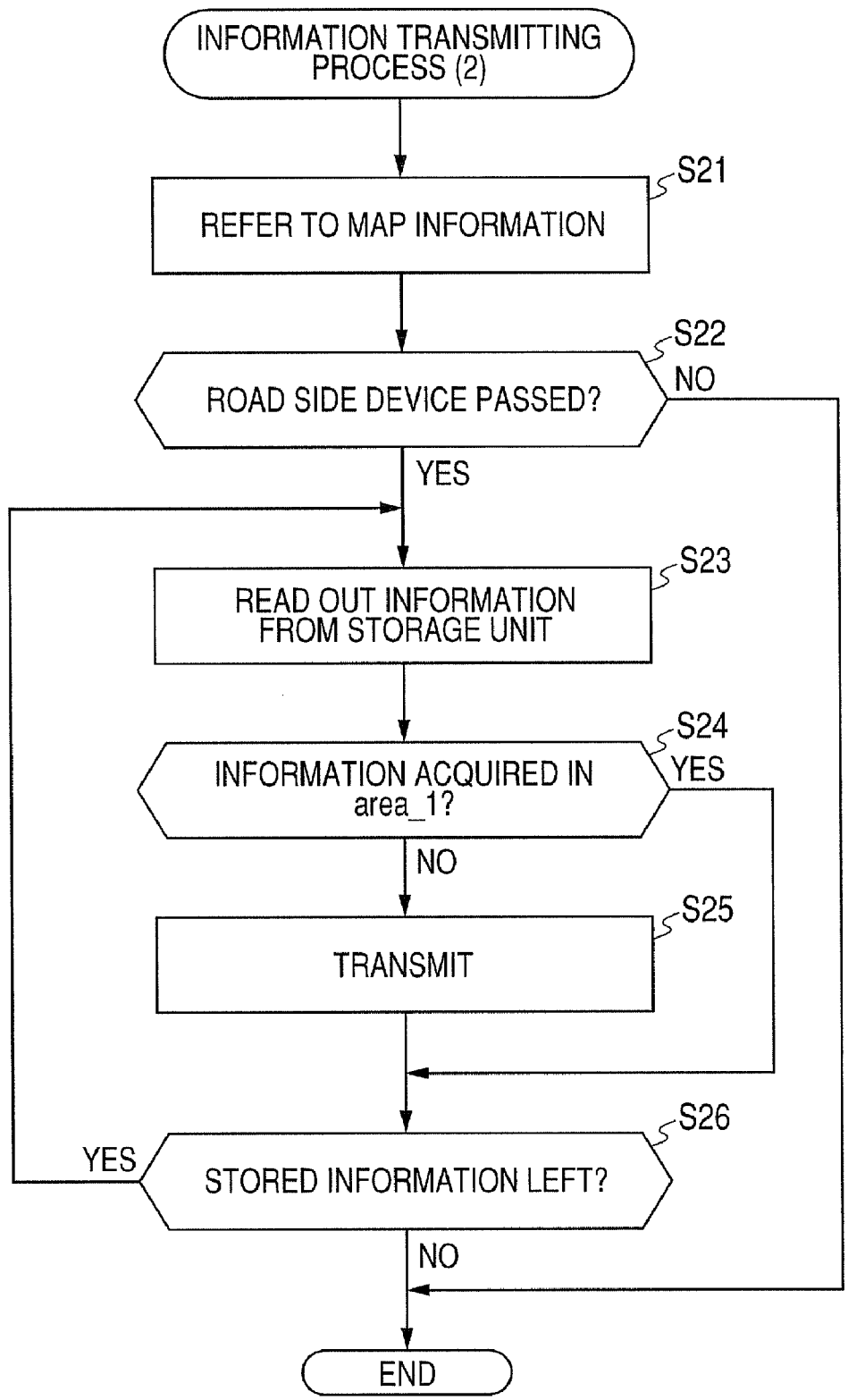
FIG. 12 is a flowchart showing an information transmitting process (2) according to the second method executed by the control unit.

When the second method is specified, the control unit 208 makes the information transmitting process (2) executed according to the flowchart shown in FIG. 12.

The control unit 208 refers to the map information stored in the storage unit 206 (step 21).

The control unit 208 judges whether the vehicle has passed near the road side device 100 or not based on the referred map information (step S22). For example, the control unit 208 makes the determination according to whether the vehicle 12 (in-vehicle device 200) is within a predetermined range from the road side device 100 or not.

If the control unit 208 judges that the vehicle 12 has not passed near the road side device 100 (step S22; No), it makes the information transmitting process (2) ended.

When the control unit 208 judges that the vehicle 12 has passed near the road side device 100 (step S22; Yes), it makes the position information Pos_x on the vehicle 12 and the time information time associated with that position information Pos_x read out from the storage unit 206 (step S23).

Then, similar to the case of the first method specified, when the control unit 208 judges that the read out position information Pos_x and time information time on the vehicle 12 were not acquired in the area area_1 (step S24; No), it makes the acquired position information Pos_x and time information time transmitted to the road side device 100 (step S25).

On the other hand, if the control unit 208 judges that those pieces of read out information were acquired in the area area_1 (step S24; Yes), it does not make those pieces of information transmitted.

When the control unit 208 has performed the process on all the information stored in the storage unit 206 (step S26; Yes, S23-S25) and judges that all the information has been read out from the storage unit 206 (step S26; No), it makes the information transmitting process (2) ended. Also in this method, the control unit 208 can make the position information Pos_x and the like stored in the storage unit 206 deleted.

Figure 13:
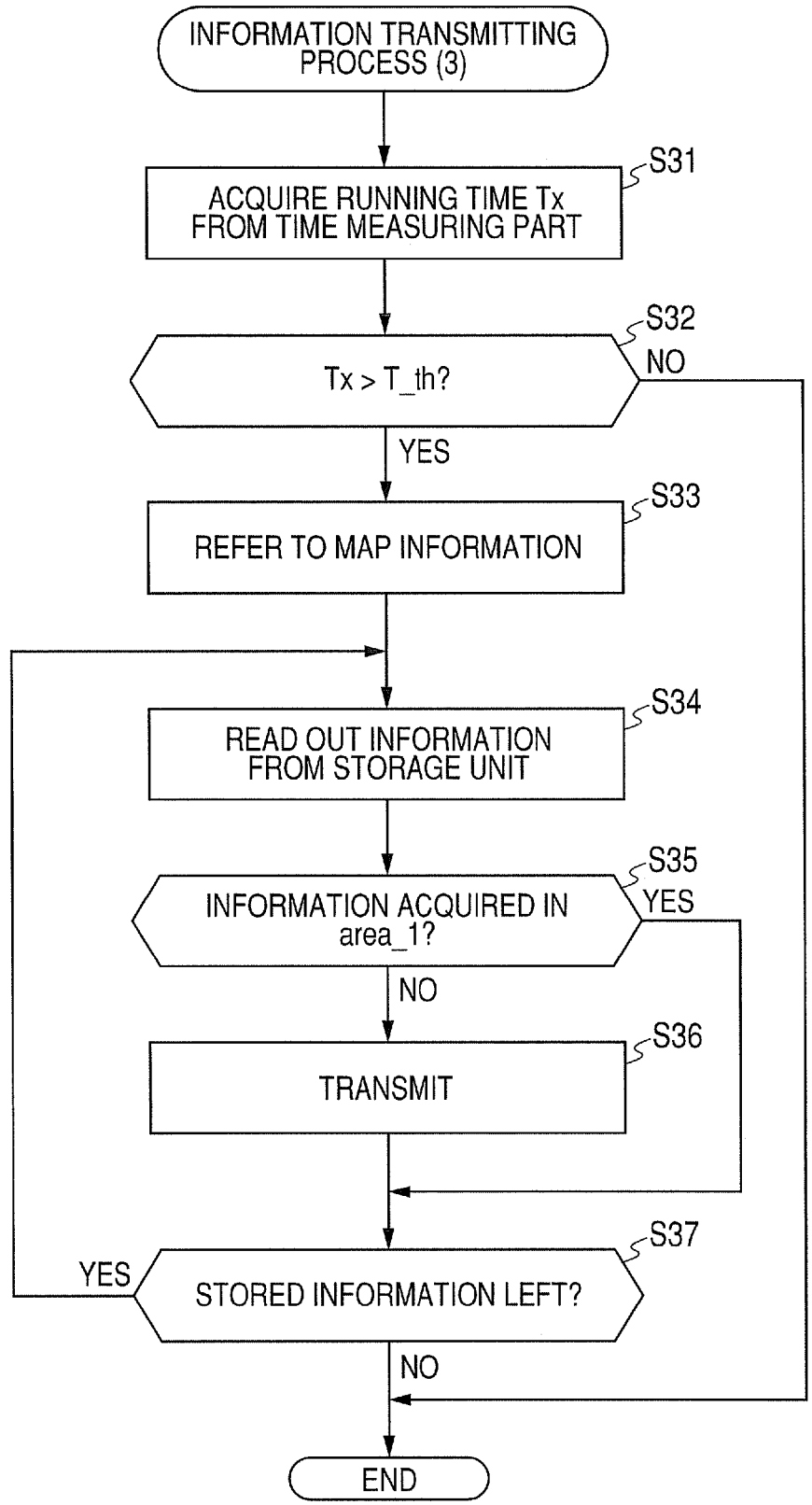
FIG. 13 is a flowchart showing an information transmitting process (3) according to the third method executed by the control unit.

When the third method is specified, the control unit 208 makes the information transmitting process (3) executed according to the flowchart shown in FIG. 13.

The control unit 208 acquires the running time $T_x$ from the time measuring part 207 (step S31). For example, the time measuring part 207 measures the elapsed time from when the engine started and the power supply of the in-vehicle device 200 was turned on up to the current time. Alternatively, it measures the elapsed time from when the power supply was turned on and it was judged that the moving speed of the vehicle 12 was not zero up to the current time.

The control unit 208 judges whether the acquired running time $T_x$ exceeds the previously set threshold time T_th or not (step S32).

If the control unit 208 judges that the acquired running time $T_x$ does not exceed the previously set threshold time T_th (step S32; No), it makes the information transmitting process (3) ended.

When the control unit 208 judges that the acquired running time $T_x$ exceeds the previously set threshold time T_th (step S32; Yes), it refers to the map information stored in the storage unit 206 (step S33).

The control unit 208 reads out the position information Pos_x and time information time on the vehicle 12 from the storage unit 206 (step S34).

Then, similar to the case of the first method specified, when the control unit 208 judges that the read out position information Pos_x and time information time on the vehicle 12 were not acquired in the area area_1 (step S35; No), it makes the acquired position information Pos_x and time information time transmitted to the road side device 100 (step S36).

On the other hand, if the control unit 208 judges that those pieces of read out information were acquired in the area area_1 (step S35; Yes), it does not make those pieces of information transmitted.

When the control unit 208 has performed the process on all the information stored in the storage unit 206 (step S37; Yes, S34-S36) and judges that all the information has been read out from the storage unit 206 (step S37; No), it makes the information transmitting process (3) ended. Also in this method, the control unit 208 can make the position information Pos_x and the like stored in the storage unit 206 deleted.

Figure 14:
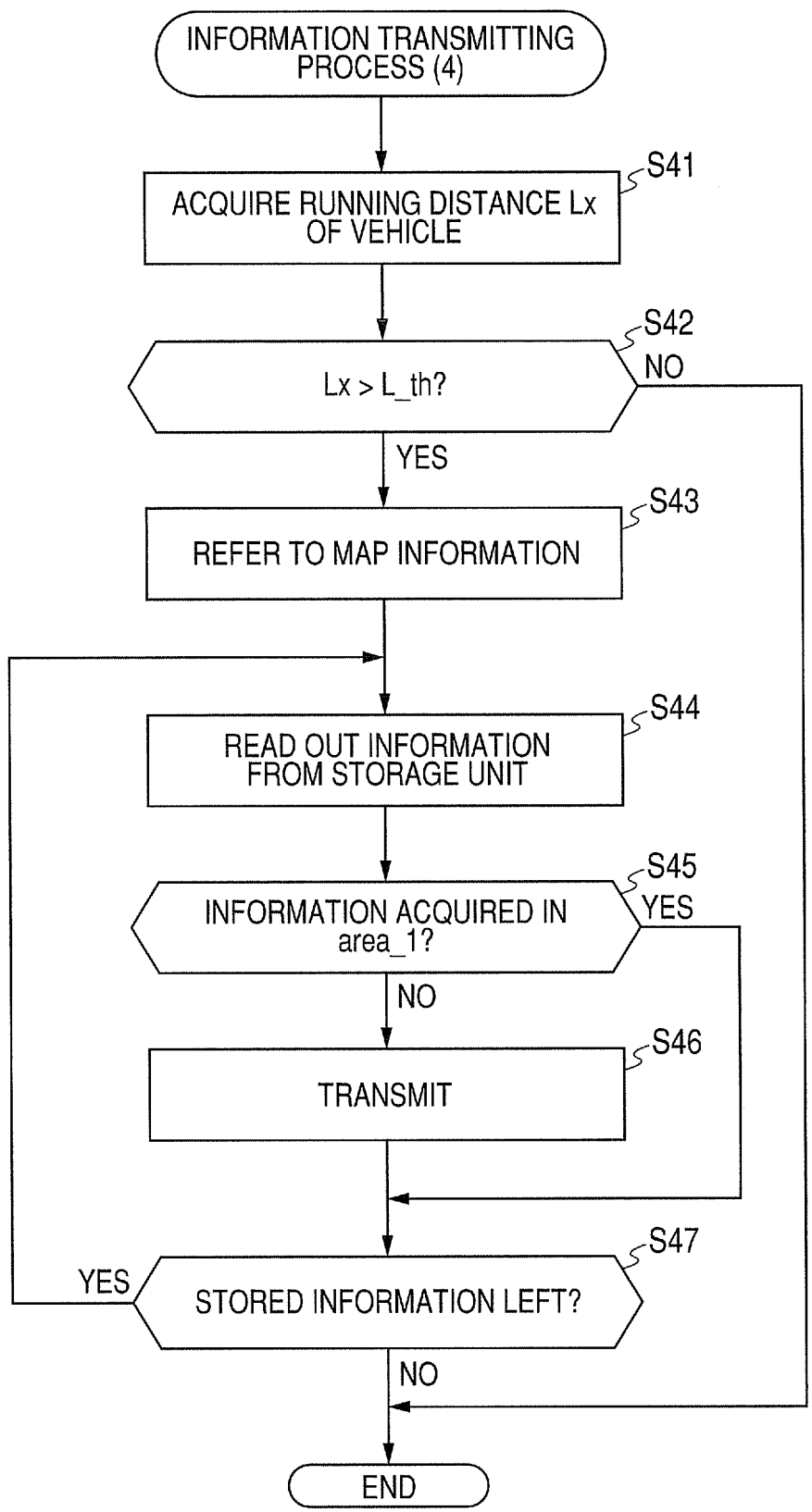
FIG. 14 is a flowchart showing an information transmitting process (4) according to the fourth method executed by the control unit.

When the fourth method is specified, the control unit 208 makes the information transmitting process (4) executed according to the flowchart shown in FIG. 14.

The control unit 208 acquires the running distance $L_x$ (step S41). For example, the control unit 208 calculates the running distance $L_x$ by adding up the lengths of the routes the vehicle 12 has passed after started the home 11a up to the current position.

The control unit 208 judges whether the acquired running distance $L_x$ exceeds the previously set threshold distance L_th or not (step S42).

If the control unit 208 judges that the acquired running distance $L_x$ does not exceed the previously set threshold distance L_th (step S42; No), it makes the information transmitting process (4) ended.

When the control unit 208 judges that the acquired running distance $L_x$ exceeds the previously set threshold distance L_th (step S42; Yes), it refers to the map information stored in the storage unit 206 (step S43).

The control unit 208 reads out the position information Pos_x and time information time on the vehicle 12 from the storage unit 206 (step S44).

Then, similar to the case of the first method specified, when the control unit 208 judges that the read out position information Pos_x and time information time on the vehicle 12 were not acquired in the area area_1 (step S45; No), it makes the acquired position information Pos_x and time information time transmitted to the road side device 100 (step S46).

On the other hand, if the control unit 208 judges that those pieces of read out information were acquired in the area area_1 (step S45; Yes), it does not make those pieces of information transmitted.

When the control unit 208 has performed the process on all the information stored in the storage unit 206 (step S47; Yes, S44-S46) and judges that all the information has been read out from the storage unit 206 (step S47; No), it makes the information transmitting process (4) ended. Also in this method, the control unit 208 can make the position information Pos_x and the like stored in the storage unit 206 deleted.

Figure 15:
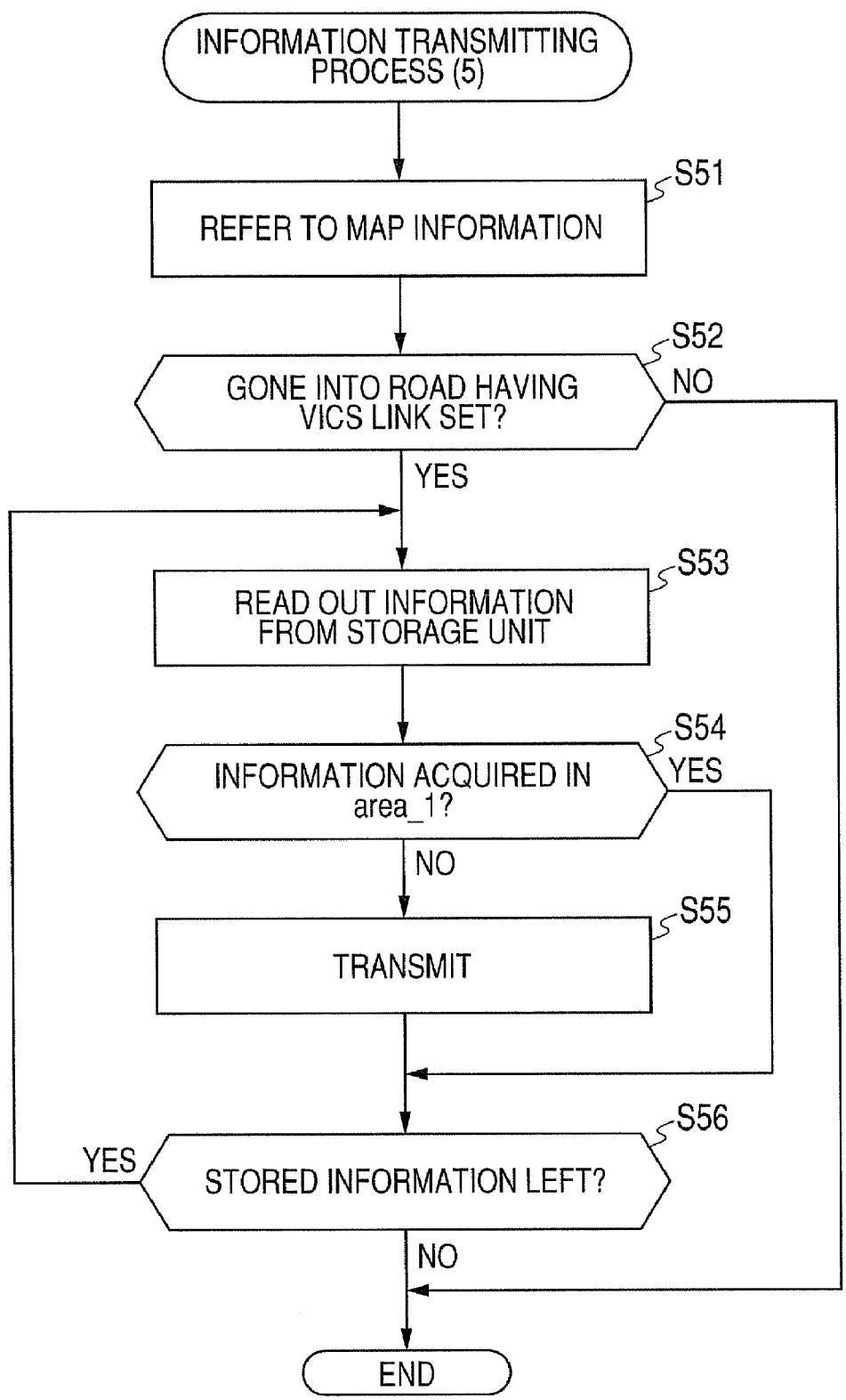
FIG. 15 is a flowchart showing an information transmitting process (5) according to the fifth method executed by the control unit.

When the fifth method is specified, the control unit 208 makes the information transmitting process (5) executed according to the flowchart shown in FIG. 15.

The control unit 208 refers to the map information stored in the storage unit 206 (step S51).

The control unit 208 judges whether the vehicle has gone into the road that has the VICS link installed or not based on the referred map information (step S52).

If the control unit 208 judges that the vehicle 12 has not gone into the road that has the VICS link installed (step S52; No), it makes the information transmitting process (5) ended.

If the control unit 208 judges that the vehicle has gone into the road that has the VICS link installed (step S52; Yes), it makes the position information Pos_x on the vehicle 12 and the time information time read out from the storage unit 206 (step S53).

Then, similar to the case of the first method specified, when the control unit 208 judges that the read out position information Pos_x and time information time on the vehicle 12 were not acquired in the area area_1 (step S54; No), it makes the acquired position information Pos_x and time information time transmitted to the road side device 100 (step S55).

On the other hand, if the control unit 208 judges that those pieces of read out information were acquired in the area area_1 (step S54; Yes), it does not make those pieces of information transmitted.

When the control unit 208 has performed the process on all the information stored in the storage unit 206 (step S56; Yes, S53-S55) and judges that all the information has been read out from the storage unit 206 (step S56; No), it makes the information transmitting process (5) ended. Also in this method, the control unit 208 can make the position information Pos_x and the like stored in the storage unit 206 deleted.

Figure 16:
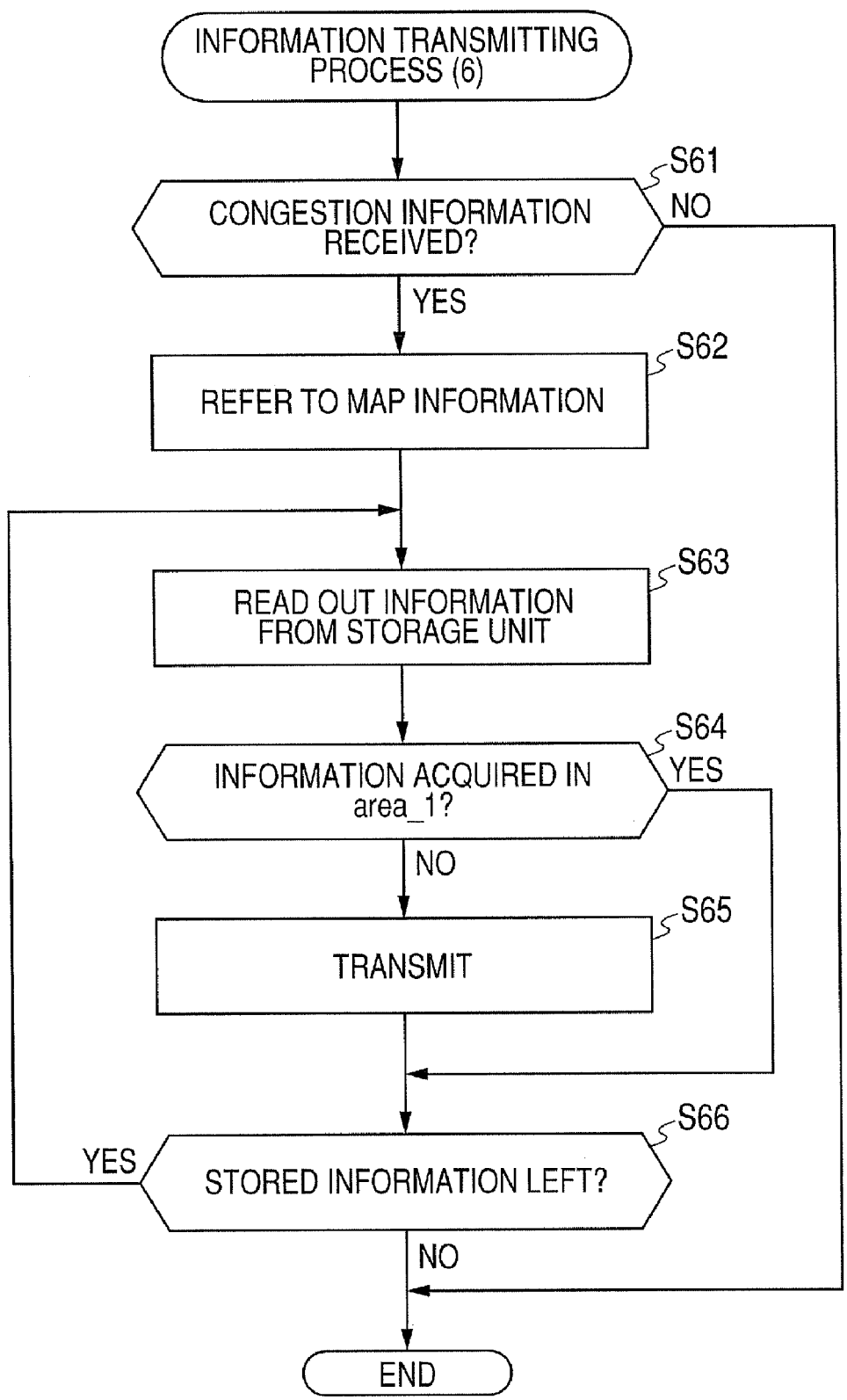
FIG. 16 is a flowchart showing an information transmitting process (6) according to the sixth method executed by the control unit.

When the sixth method is specified, the control unit 208 makes the information transmitting process (6) executed according to the flowchart shown in FIG. 16.

The control unit 208 judges whether the congestion information has been received or not (step S61).

If the control unit 208 judges that the congestion information has not been received (step S61; No), it makes the information transmitting process (6) ended.

When the control unit 208 judges that the congestion information has been received (step S61; Yes), it refers to the map information stored in the storage unit 206 (step S62).

The control unit 208 makes the position information Pos_x on the vehicle 12 and the time information time read out from the storage unit 206 (step S63).

Then, similar to the case of the first method specified, when the control unit 208 judges that the read out position information Pos_x and time information time on the vehicle 12 were not acquired in the area area_1 (step S64; No), it makes the acquired position information Pos_x and time information time transmitted to the road side device 100 (step S65).

On the other hand, if the control unit 208 judges that those pieces of read out information were acquired in the area area_1 (step S64; Yes), it does not make those pieces of information transmitted.

When the control unit 208 has performed the process on all the information stored in the storage unit 206 (step S66; Yes, S63-S65) and judges that all the information has been read out from the storage unit 206 (step S66; No), it makes the information transmitting process (6) ended. Also in this method, the control unit 208 can make the position information Pos_x and the like stored in the storage unit 206 deleted.

Figure 17:
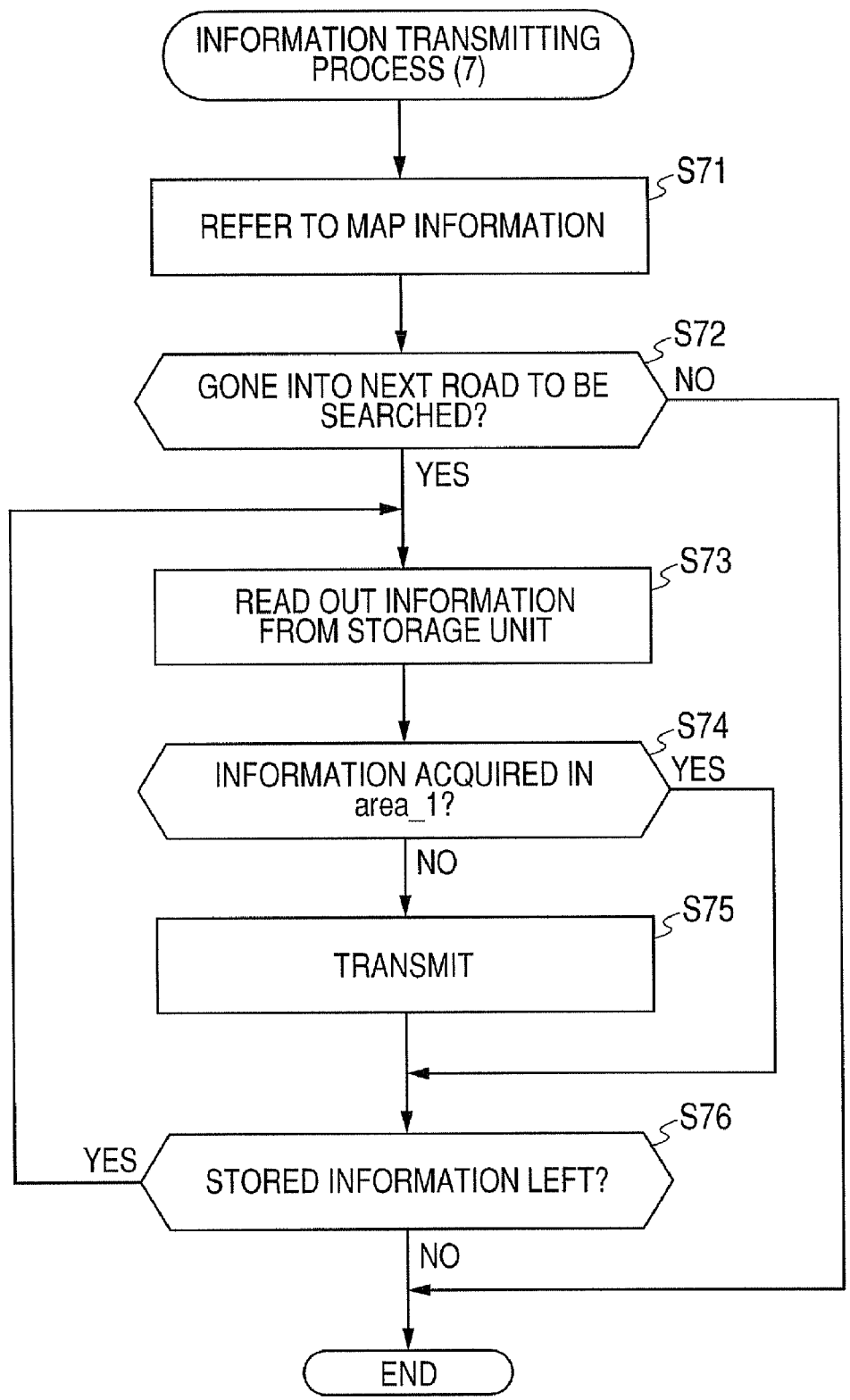
FIG. 17 is a flowchart showing an information transmitting process (7) according to the seventh method executed by the control unit.

When the seventh method is specified, the control unit 208 makes the information transmitting process (7) executed according to the flowchart shown in FIG. 17.

The control unit 208 refers to the map information stored in the storage unit 206 (step S71).

The control unit 208 judges whether the vehicle 12 has gone into the next road to be searched or not based on the referred map information (step S72).

If the control unit 208 judges that the vehicle 12 has not gone into the next road to be searched (step S72; No), it makes the information transmitting process (7) ended.

If the control unit 208 judges that the vehicle 12 has gone into the next road to be searched (step S72; Yes), it makes the position information Pos_x on the vehicle 12 and the time information time read out from the storage unit 206 (step S73).

Then, similar to the case of the first method specified, when the control unit 208 judges that the read out position information Pos_x and time information time on the vehicle 12 were not acquired in the area area_1 (step S74; No), it makes the acquired position information Pos_x and time information time transmitted to the road side device 100 (step S75).

On the other hand, if the control unit 208 judges that those pieces of read out information were acquired in the area area_1 (step S74; Yes), it does not make those pieces of information transmitted.

When the control unit 208 has performed the process on all the information stored in the storage unit 206 (step S76; Yes, S73-S75) and judges that all the information has been read out from the storage unit 206 (step S76; No), it makes the information transmitting process (7) ended. Also in this method, the control unit 208 can make the position information Pos_x and the like stored in the storage unit 206 deleted.

When the control unit 208 of the in-vehicle device 200 executes any of the information transmitting processes (1) to (7) in the aforementioned manner, the radio communication part 101 of the nearby road side device 100 receives the vehicle ID, position information Pos_x, and time information time on the vehicle 12 from the in-vehicle device 200 of the vehicle 12.

The road side device 100 stores the vehicle ID, position information Pos_x, and time information time on the vehicle 12 received by the radio communication part 101 into the storage unit 103 and transmits those pieces of the stored information to the traffic information distribution server 300 via the communication control part 102 and the ITS network NW2.

The traffic information distribution server 300 receives the information transmitted by the road side device 100, and generates various kinds of traffic information based on the received information.

As described above, according to the embodiment, the control unit 208 of the in-vehicle device 200 is adapted not to transmit the position information Pos_x and the like on the vehicle 12 that have been acquired by the GPS module 201a in the area area_1 in which the home 11a is at the center and the position of the home 11a is easily determined, but to transmit the position information Pos_x and the like on the vehicle 12 that have been acquired by the GPS module 201a after the vehicle 12 and the like have gone out of the area area_1 to the road side device 100.

Therefore, since the home 11a cannot be determined from the transmitted position information Pos_x, the personal information can be prevented from leaking out and the personal information can be protected.

In addition, the control unit 208 is adapted to stop transmitting the position information Pos_x and time information time on the vehicle 12 that have been acquired by the GPS module 201a in an area in which the destination 11b is at the center and the destination 11b can be determined. That makes the destination 11b hard to be determined either, and further promotes the personal information protection.

Although the embodiment has been described in the case in which the in-vehicle device 200 navigates through the moving route from the home 11a to the destination 11b, the aforementioned processes needs not to be executed with the navigation. That is, the present invention can be adapted not to transmit the position information Pos_x and the like on the vehicle 12 that have been acquired by the GPS module 201a in the area area_1 that has the position of the home 11a at the center, even without the destination 11b specified by the user.

Second Embodiment

Figure 18:
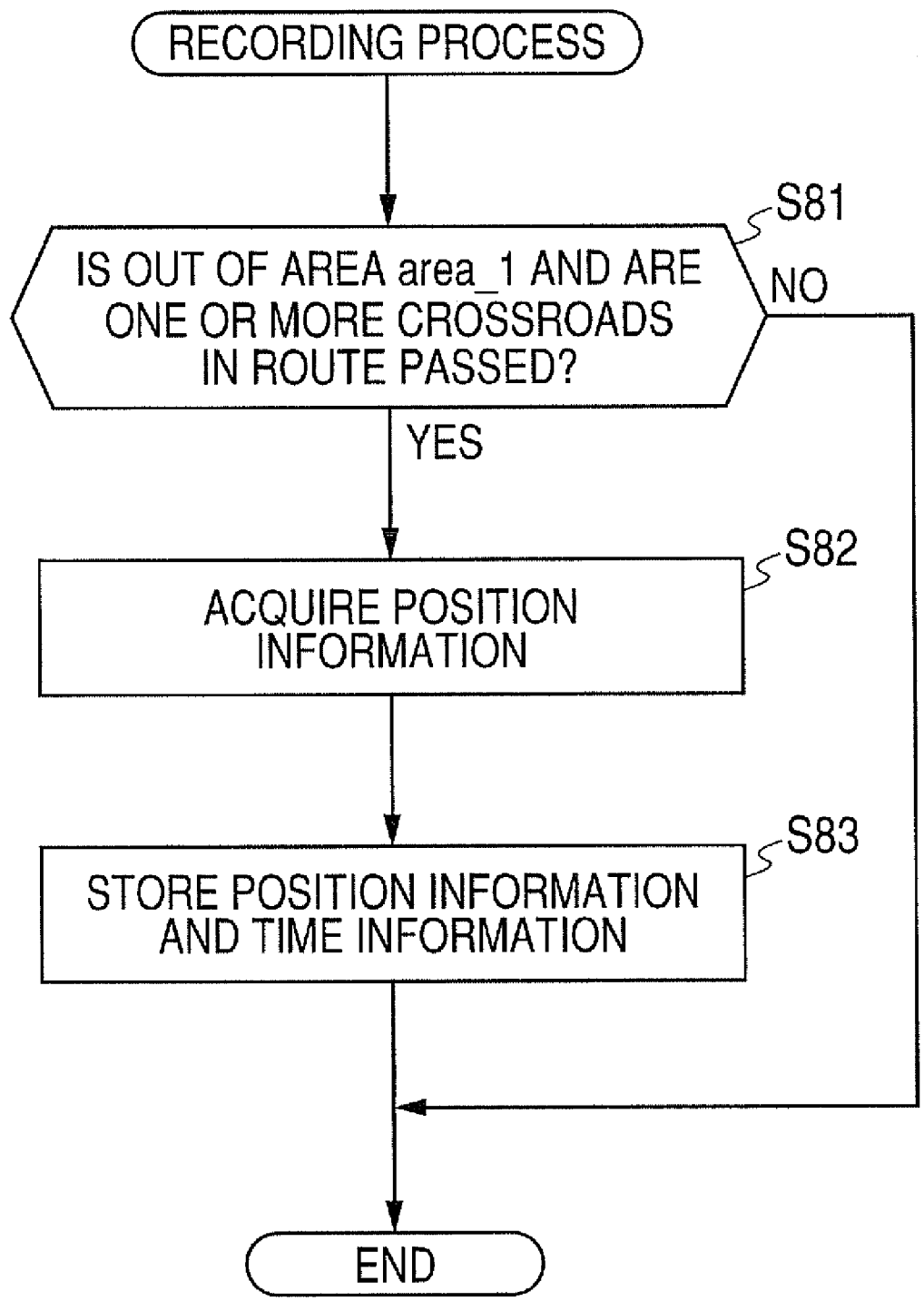
FIG. 18 is a flowchart showing a recording process of a second embodiment.

Now, another embodiment of the present invention will be described. In the above-described embodiment, the control unit 208 makes a running history including the position information Pos_x and the like stored after the power supply of the in-vehicle device 200 is turned on; though, the embodiment differs from that in that the running history is made to be stored when a predetermined condition is satisfied after the power supply of the in-vehicle device 200 has been turned on. That will be described below with reference to the flowchart of FIG. 18.

When the predetermined condition "one or more crossroads have been passed after the power supply of the in-vehicle device 200 was turned on" is satisfied, the control unit 208 makes the position information Pos_x and time information time that have been acquired thereafter transmitted to the road side device 100. It does not make those pieces of information transmitted to the road side device 100 unless that condition is satisfied.

Specifically, the control unit 208 judges whether one or more crossroads have been passed or not on the route from the home 11a to the current position based on map data stored in the storage unit 206 and the position information acquired by the GPS module 201a (step S81). For example, the crossroads is a relatively big crossroads with the crossroads name as map data. The crossroads may also have a traffic light installed. The crossroads is desirably a relatively big one instead of a small crossing or small t-intersection.

When the current position is out of the area area_1 and the predetermined condition is satisfied (step S81; Yes), the control unit 208 acquires the position information Pos_x and time information time (step S82). Then, it makes the storage unit 206 store the acquired position information Pos_x and time information time (step S83).

On the other hand, if the current position is not out of the area area_1 or if the predetermined condition is not satisfied (step S81; No), the control unit 208 makes the recording process ended. In other words, the running history is not stored in the storage unit 206 in that case.

As a predetermined condition, "the vehicle 12 has turned to the left or to the right at one or more crossroads after the power supply of the in-vehicle device 200 was turned on" may be defined. In that case, the control unit 208 only needs to judge whether the vehicle 12 has sheered by a left-turn or a right-turn at one or more crossroads or not based on the map data and a passed route at step S81. The control unit 208 determines the right-turn and the left-turn according to whether the vehicle 12 has actually passed the position that requires the vehicle 12 to actuate a direction indicator for sheering by comparing the map data and the passed route. The control unit 208 may determine the right-turn and the-left turn according to whether the direction indicator of the vehicle 12 was actuated by the user or not.

The vehicle 12 has passed one crossroads in the embodiment; though, it is needless to say that the number of the crossroads for the vehicle 12 to pass may be two or more. The expression "pass the crossroads" may refer to any of the direct passage through the crossroads, the left-turn at the crossroads, and the right-turn at the crossroads, or may refer to a condition made by a combination of them such as "turn to the left or turn to the right at N or more crossroads and pass direct through M or more crossroads". N and M are integers valued at zero or more.

The predetermined condition adopted in the embodiment may be used in the above-described first embodiment. That is, the control unit 208 may be adapted to control the communication part 201 to transmit the position information to the road side device 100 when the condition is satisfied.

Third Embodiment

Figure 19:
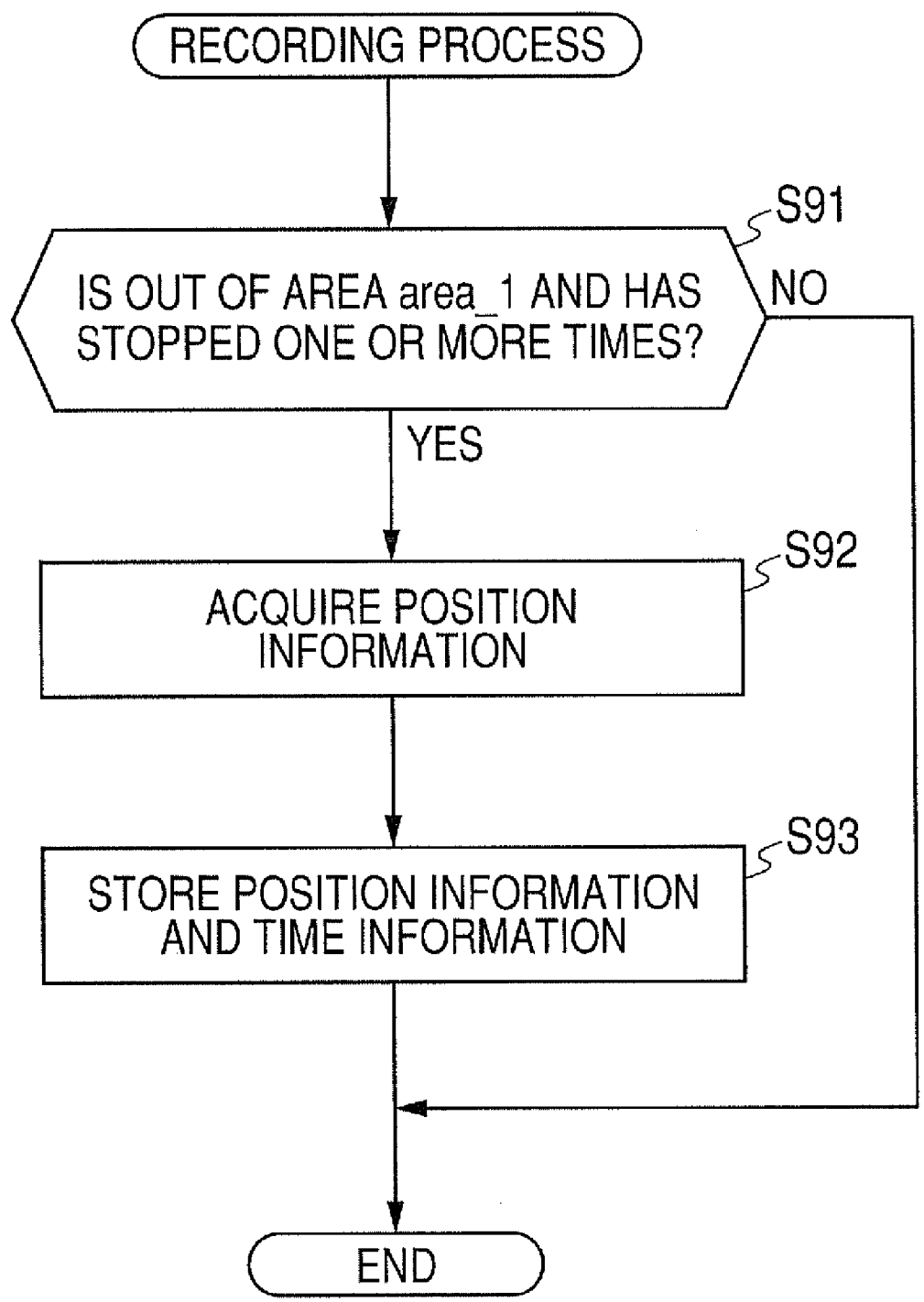
FIG. 19 is a flowchart showing a recording process of a third embodiment.

Now, another embodiment of the present invention will be described. Also in the embodiment, the control unit 208 makes the running history stored when a predetermined condition is satisfied. That will be described below with reference to the flowchart of FIG. 19.

When the predetermined condition "the vehicle 12 has stopped one or more times after the power supply of the in-vehicle device was turned on and the vehicle 12 started running" is satisfied, the control unit 208 makes the position information Pos_x and time information time that have been acquired thereafter transmitted to the road side device 100. It does not make those pieces of information transmitted to the road side device 100 unless that condition is satisfied.

Specifically, the control unit 208 judges whether the vehicle 12 has actuated the brake to stop for one or more times or not after the power supply of the in-vehicle device 200 was turned on and the vehicle 12 started running based on an input from a brake sensor (step S91).

When the current position is out of the area area_1 and after the predetermined condition is satisfied (step S91; Yes), the control unit 208 acquires the position information Pos_x and time information time (step S92). Then, it makes the storage unit 206 store the acquired position information Pos_x and time information time (step S93).

On the other hand, if the current position is out of the area area_1 or if the predetermined condition is not satisfied (step S91; No), the control unit 208 makes the recording process ended. In other words, the running history is not stored in the storage unit 206 in that case.

For example, the control unit 208 judges whether the vehicle 12 has stopped or not by sensing a speed pulse from a speed sensor or depression of the foot brake and maneuvering of the parking brake (side brake) by a brake sensor.

The control unit 208 may calculate an amount of change in the acquired position information Pos_x per unit time and judge that the vehicle 12 stops when the amount of change is a predetermined value or less (typically zero).

The predetermined condition adopted in the embodiment may be used in the above-described first embodiment. That is, the control unit 208 may be adapted to control the communication part 201 to transmit the position information to the road side device 100 when the condition is satisfied.

Fourth Embodiment

Figure 20:
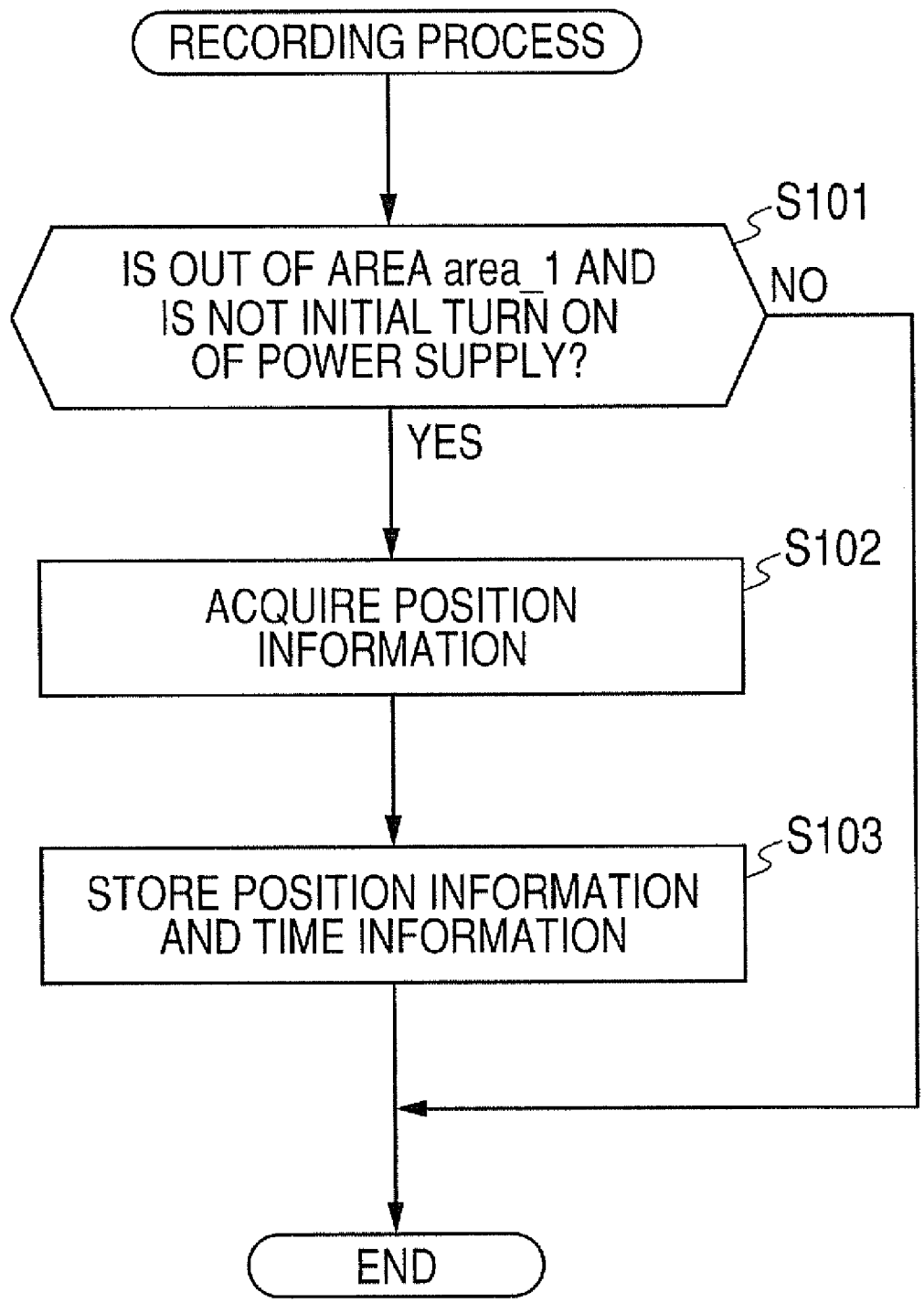
FIG. 20 is a flowchart showing a recording process of a fourth embodiment.

Now, another embodiment of the present invention will be described. Also in the embodiment, the control unit 208 makes the running history stored when a predetermined condition is satisfied. That will be described below with reference to the flowchart of FIG. 20.

When the predetermined condition "the power supply of the in-vehicle device 200 has been turned on and off for X times or more in a predetermined time period" is satisfied, the control unit 208 makes the position information Pos_x and time information time that have been acquired thereafter transmitted to the road side device 100. It does not make those pieces of information transmitted to the road side device 100 unless that condition is satisfied. X is an integer at one or more.

This is because since such a custom of switching off the engine while waiting at a traffic signal or the like, so-called idling stop, has been widespread due to recently growing environmental concerns, the place where the power supply is turned on is not necessarily the origin unlike in the above-described embodiments. Accordingly, the trigger of the embodiment is turning on of the power supply of the vehicle 12 again in a certain time period (for example, three to five minutes) after the first cutoff of the power supply (idling stop) since the vehicle 12 started the home 11a.

Specifically, when the power supply of the in-vehicle device 200 is turned on, the control unit 208 makes the storage unit 206 store the time when the power supply is turned on. The storage unit 206 accumulates a start record (log) that indicates the time when the power supply is turned on. When the power supply of the in-vehicle device 200 is turned on, the control unit 208 judges whether the current turning on of the power supply is the first turning on of the power supply or not (step S101). The control unit 208 reads out the accumulated start record, and if the certain time period (for example, three to five minutes) or more has elapsed after the previous turning on of the power supply up to the current time, it typically judges that the present turning on of the power supply is the first turning on of the power supply.

When the current position is out of the area area_1 and after the predetermined condition is satisfied (step S101; Yes), the control unit 208 acquires the position information Pos_x and time information time (step S102). Then, it makes the storage unit 206 store the acquired position information Pos_x and time information time (step S103).

On the other hand, if the current position is out of the area area_1 or if the predetermined condition is not satisfied (step S101; No), the control unit 208 makes the recording process ended. In other words, the running history is not stored in the storage unit 206 in that case.

Thus, according to the embodiment, whether or not to store the position information Pos_x and the like that are acquired at such an occasion of repeated turning on and off of the power supply in a short time period due to so-called idling stop or the like, and also whether or not to transmit the position information Pos_x and the like acquired can be controlled. It is needless to say that each of the predetermined time period in the above-described predetermined condition, the number of times X of turning on and off of the power supply, and the predetermined time period for judging whether the current turning on of the power supply is the first turning on of the power supply or not can be arbitrarily changed. It is desirable for the control unit 208 to regularly delete the start record accumulated in the storage unit 206.

The predetermined condition adopted in the embodiment may be used in the above-described first embodiment. That is, the control unit 208 may be adapted to control the communication part 201 to transmit the position information to the road side device 100 when the condition is satisfied.

Fifth Embodiment

Figure 21:
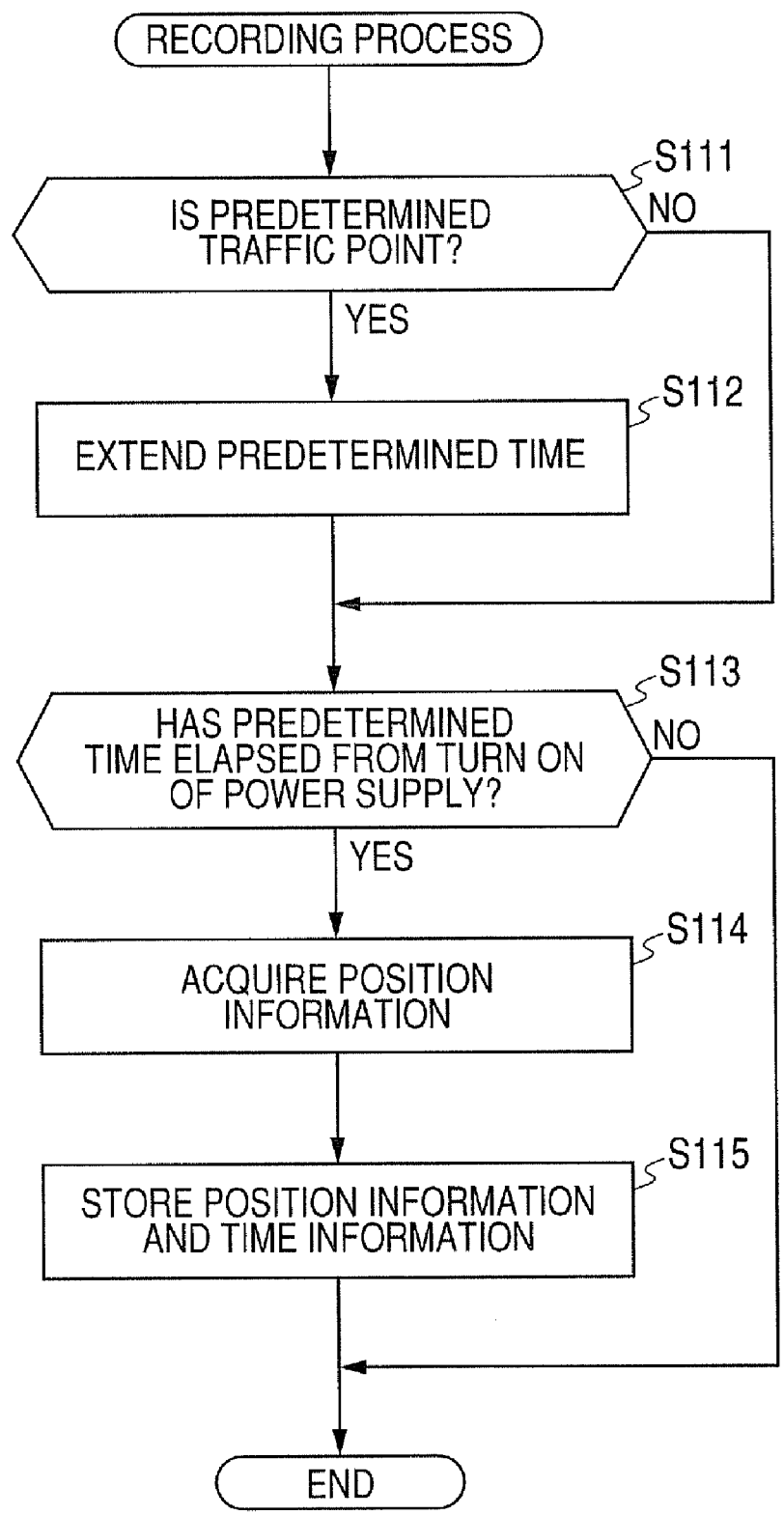
FIG. 21 is a flowchart showing a recording process of a fifth embodiment.

Now, another embodiment of the present invention will be described. For example, if the transmitting timing is decided according to a predetermined condition, the storage or transmission of the running history is started near the home 11*a* in such a case in which the vehicle 12 stops at a railroad crossing or the like for a long time period. For example, with such a predetermined condition as "a predetermined time period has elapsed after the power supply of the in-vehicle device 200 is turned on", when the vehicle 12 stops at a railroad crossing and still stays near the home 11*a* even after the predetermined time period has elapsed, the controlling of the transmitting timing may not take effect in the end. Therefore, in the embodiment, if it is predicted that the stoppage time will increase because of a railroad crossing or the like based on the map data, a time period after the power supply of the in-vehicle device 200 is turned on till the accumulation of the running history into the storage unit 206 is started or till the transmission of the running history is started can be extended. That will be described below with reference to the flowchart of FIG. 21.

When the predetermined condition "a predetermined time period $T_p$ has elapsed after the power supply was turned on" is satisfied, the control unit 208 makes the position information Pos_x and time information time that have been acquired thereafter transmitted to the road side device 100. It does not make those pieces of information transmitted to the road side device 100 unless that condition is satisfied. An initial value for the predetermined time period $T_p$ is represented as T1. The time measuring part 207 measures time elapsed after the power supply of the in-vehicle device 200 is turned on.

Specifically, the control unit 208 judges whether the traffic point that is predicted to increase the stoppage time of the vehicle 12 is near the home 11*a* or not by reading out the map data near the home 11*a* from the storage unit 206 and searching the map data (step S111). As the predetermined traffic point, a railroad crossing can be considered, for example. The range on the map to be searched by the control unit 208 is within a circle having a radius R with the position of the home 11*a* at the center. R is previously determined as the number valued at 0 or more.

If it is judged that the predetermined traffic point is present (step S111; Yes), the control unit 208 adds the extended time Te to the initial value T1 and make the added time T1+Te a new predetermined time period $T_p$. That is, the control unit 208 extends the predetermined time period $T_p$ (step S112). On the other hand, when it is judged that the predetermined traffic point is not present (step S111; No), the control unit 208 does not extend the predetermined time period $T_p$ and proceeds to the process of step S113.

Then, the control unit 208 judges whether the predetermined time period $T_p$ has elapsed after the power supply was turned on or not (step S113).

When it is judged that the predetermined time $T_p$ has elapsed (step S113; Yes), the control unit 208 acquires the position information Pos_x and time information time (step S114). Then, it makes the storage unit 206 store the acquired position information Pos_x and time information time (step S115).

On the other hand, if it is judged that the predetermined time $T_p$ has not elapsed (step S113; No), the control unit 208 makes the process ended. In that case, the control unit 208 does not make the position information Pos_x and time information time transmitted to the storage unit 206.

In the embodiment, the control unit 208 checks whether the position information Pos_x and time information time have been newly accumulated (added) to the storage unit 206, and if they have been added, it makes those pieces of information transmitted to the road side device 100 via the communication part 201. That is, without information on the running history stored in the storage unit 206, the information on the running history is not transmitted to the road side device 100, and the personal information can be protected in the end.

The embodiment is adapted to extend the predetermined time $T_p$ when map data is searched and if a railroad crossing is near the home 11*a*; though, it may be adapted to extend the time because of another traffic point. For example, the traffic point may be a railway station, a large shopping mall, an amusement park, well-known historic site, scenic beauty, tourist resort, and an entrance of a toll road. Further, the time may be extended if the difference of elevation is big in the vicinity of the home 11*a*. Since such information is generally recorded in the map data in a usual navigation system, it is effective in determining whether or not to extend the time.

As an application, the predetermined time $T_p$ may be extended when the traffic information indicating that traffic congestion is occurring in the vicinity of the home 11*a* is acquired by the VICS module 201*b*. Alternatively, by acquiring weather information with the traffic information, the predetermined time $T_p$ may be extended when the weather is bad (for example, rain, snow or the like). In that case, the weather information may be acquired separately from the traffic information and if such keywords as "heavy rain" and "snowfall" are included in the acquired traffic information, the predetermined time $T_p$ may be extended by taking the keywords as hints of weather information. This is because the vehicle may take longer time in running under the bad weather.

Alternatively, the predetermined time $T_9$ may be extended according to the current time. For example, one predetermined time $T_p1$ is used in the daytime and another predetermined time $T_p2$ ($>T_p1$) is used in the nighttime. This is because the drivers seldom speed up or traffic restrictions are imposed because of roadworks or the like in the nighttime, thus, the vehicle may take longer time in running.

The predetermined condition adopted in the embodiment may be used in the above-described first embodiment. That is, the control unit 208 may be adapted to control the communication part 201 to transmit the position information to the road side device 100 when the condition is satisfied.

Sixth Embodiment

Now, another embodiment of the present invention will be described. In the above-described embodiments, the in-vehicle device 200 may be adapted not to transmit the running history by adjusting timing of transmitting the running history of the vehicle 12 from the standpoint of protecting personal information; though, the running history should be transmitted in some cases instead. For example, a vehicle for business use, a taxi, a bus, an emergency vehicle, and the like may preferably transmit their running history, instead.

Then, the storage unit 206 is also capable of further storing additional information indicating the model, the use and the like of the vehicle 12. Alternatively, the storage unit 206 may store a flag indicating whether or not to perform the above-described information transmitting process or recording process. The control unit 208 judges whether or not to start the above-described information transmitting process or recording process based on the additional information or flag, and only when it judges to start the process, it starts the process.

If the control unit 208 judges not to start each of the above-described processes based on the additional information or flag, it only needs to acquire the position information Pos_x and time information time and transmit them to the road side device 100 without regard of the area area_1 or each of the predetermined conditions.

The above-described embodiments can be applied to various forms and the present invention is not limited to the above-described embodiments.

For example, the in-vehicle device 200 may be adapted to select one from the first method to the seventh method as a method of setting up the transmitting timing, instead of having one specified.

That is, when the in-vehicle device 200 judges that the home 11a is in a neighborhood of metropolitan area type based on the map information stored in the storage unit 206, it not only reduces the area area_1 but also selects the third method or the fourth method.

Since the third method and the fourth method judge the area area_1 based on the running time and the running distance, they are more advantageous than the other methods when used in the metropolitan area type that has the higher residential density. It is possible for the in-vehicle device 200 to select the third method first and the fourth method on the next day.

By changing the method of setting up the transmitting timing as described above, the setting up method is made harder to be determined, which can protect the personal information.

In the above-described embodiments, the control unit 208 judges whether the position information Pos_x on the vehicle 12 read out from the storage unit 206 has been acquired in the area area_1 or not for deciding whether or not to transmit the information.

The control unit 208, however, may control the transmission by controlling the GPS module 201a not to receive the GPS radio waves until the previously set time has elapsed after the vehicle 12 started the home 11a.

The above-described embodiments have been described in the case of using the DSRC road side device 100. The present invention, however, is not limited to that and the case of using a cellular phone or a wireless LAN instead of the DSRC road side device 100 can be applied to the embodiments.

The above-described embodiments have been described that the in-vehicle device 200 does not transmit the position information Pos_x and the like that have been acquired in the area area_1. The present invention, however, may have such a configuration (specification) as it can stop the transmission of the position information Pos_x and the like and release the transmission stop in response to an indication input of Allow or Not Allow by the user.

In the above-described embodiments, the mobile body has been described as the vehicle 12. The present invention, however, is not limited to that and the embodiments can be applied to the case in which the mobile body is a person and a cellular phone or the like that can acquire the position by means of GPS is used in place of the in-vehicle device 200.

In the above-described embodiments, the operation part 204 receives an indication input showing the destination of the vehicle 12 (may be the origin or both of the origin and the destination) from the user; though, the control unit 208 may make the storage unit 206 store information showing the position of the origin or destination received from the user as the user information so that it reads out the user information for setting the destination or the origin as required. For example, the control unit 208 may previously receive an input of a user's favorite position (typically, the position of the home 11a) from the user and make the storage unit 206 store that. That can disable the transmission of the position information and the like that have been acquired in the area area_1 even when the vehicle 12 starts moving without starting the navigation using the in-vehicle device 200.

In the above-described embodiments, the area area_1 has been described as a circle having a predetermined radius with the home 11a at the center; though, the area area_1 may be set in another way. For example, a local block including the origin or the destination may be the area area_1. The local block here refers to a town unit represented by the street name such as No. 1, XXX street. A region associated with the same zip code or the same area code may be one block. With those pieces of information previously stored in the map information, the control unit 208 reads out the address (or the zip code, the area code or the like) of the origin or the destination and sets the region with the same town name (or the zip code, the area code or the like) to the area area_1. In that case, the area area_1 is in a variety of shapes instead of circle. When the current position of the vehicle 12 is in the area area_1 (in the same town or the like), the control unit 208 does not make the acquired position information Pos_x and the like transmitted to the road side device 100 (or does not make the storage unit 206 store that). For example, since the position information Pos_x and the like are not transmitted to the traffic information distribution server 300 until the vehicle 12 goes into the town that is different from the town including the home 11a in this manner, the information that makes the position of the home 11a determined easier can be prevented from leaking out.

When the position of the origin or the destination is in the border part of the set area_11a, at the outskirts of the town, or next to another town, the transmission of the position information area_1 is started immediately after the vehicle 12 started the origin (or the transmission of the position information area_1 is kept immediately before the vehicle 12 arrives there). Therefore, desirably, the area area_1 is partly enlarged. That is to say, the above-described embodiments are combined and used with such conditions as "not transmit in a predetermined time period after the vehicle 12 started" or "not transmit until a predetermined distance has run after the vehicle 12 started", for example.

In addition, from the standpoint of protecting the personal information or car security, the present invention may have coordinates (latitude and longitude) specified and control not to transmit the coordinates within a range of a predetermined distance from the specified coordinates to an outside system such as the road side device. For example, the present invention can make coordinate information on a site (for example, the position where the power supply of the navigation device is turned off or where the engine of the vehicle is switched off) within a predetermined distance (for example, 100 m) from the home, place of work, or specific destination (specified by the user) as the center not to be transmitted to the road side device or the like. That can effectively prevent leakage of the coordinate information that determines the home that is the site the user starts every day, the place of work where the user attends, or a specific place to visit that the user wants nobody to know, promoting the personal information protection and car security in the end.

In the above-described embodiments, the programs have been described as previously stored in memory and the like. The present invention, however, may be adapted to make the navigation system operate as a whole or a part of the device, or distribute the programs for executing the above-described processes stored on a computer readable recording medium such as a flexible disk, a CD-ROM (Compact Disk Read-Only Memory), a DVD (Digital Versatile Disk), an MO (Magneto Optical disk) and the like and make the programs installed in another computer to make the computer operate as the above-described means, or make the computer execute the above-described processes.

Further, the present invention may have the programs stored in the disk device or the like included in the server device on the Internet so that the programs are downloaded to the computer by superimposing the programs on carrier waves, for example.

What is claimed is:

1. A mobile body position information transmitting device for a navigation system, the transmitting device comprising:
   a position information acquiring unit adapted to acquire position information indicating a current position of a mobile body;
   a judging unit adapted to judge whether the current position acquired by the position information acquiring unit is included in an area previously set by a user or not; and
   a position information storing unit adapted to only store the position information acquired by the position information acquiring unit, if the judging unit judges that the current position is not included in the area; and
   a position information transmitting unit adapted to receive a request to transmit the position information stored in the position information storing unit from a communication device installed at a roadside and transmitting the position information stored in the position information storing unit to the communication device in response to the request.

* * * * *